(12) United States Patent
Feng et al.

(10) Patent No.: US 12,484,044 B2
(45) Date of Patent: *Nov. 25, 2025

(54) SEMI-PERSISTENT RESOURCE ALLOCATION FOR V2V TRAFFIC

(71) Applicant: Panasonic Intellectual Property Corporation of America, Torrance, CA (US)

(72) Inventors: Sujuan Feng, Frankfurt (DE); Joachim Loehr, Hessen (DE); Prateek Basu Mallick, Hessen (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 18/156,949

(22) Filed: Jan. 19, 2023

(65) Prior Publication Data

US 2023/0156691 A1 May 18, 2023

Related U.S. Application Data

(63) Continuation of application No. 17/177,603, filed on Feb. 17, 2021, now Pat. No. 11,595,977, which is a
(Continued)

(51) Int. Cl.
*H04W 72/12* (2023.01)
*H04W 4/46* (2018.01)
(Continued)

(52) U.S. Cl.
CPC ......... *H04W 72/1263* (2013.01); *H04W 4/46* (2018.02); *H04W 72/23* (2023.01)

(58) Field of Classification Search
CPC ........... H04W 4/46; H04W 4/44; H04W 4/40; H04W 4/38
See application file for complete search history.

(56) References Cited

U.S. PATENT DOCUMENTS

| | | | |
|---|---|---|---|
| 9,426,783 | B2 | 8/2016 | Gleixner |
| 9,911,333 | B2 | 3/2018 | Stählin et al. |
| | | (Continued) | |

FOREIGN PATENT DOCUMENTS

| | | |
|---|---|---|
| CN | 103813461 A | 5/2014 |
| CN | 104145525 A | 11/2014 |
| | (Continued) | |

OTHER PUBLICATIONS

3GPP TR 21.905 V13.0.0, "3rd Generation Partnership Project; Technical Specification Group Services and System Aspects; Vocabulary for 3GPP Specification (Release 13)," Dec. 2015, 64 pages.
(Continued)

*Primary Examiner* — Khalid W Shaheed
(74) *Attorney, Agent, or Firm* — Seed Intellectual Property Law Group LLP

(57) ABSTRACT

The invention relates to an improved semi-persistent resource allocation for a mobile terminal (MT) for transmitting periodic data. The MT transmits information on the periodic data to the radio base station (BS), such that the BS determines the different possible transmission periodicities and/or the different possible message sizes of the data components of the periodic data. The MT receives from the BS plural semi-persistent resource (SPS) configurations, each being usable to transmit at least one of the supported data components. The MT indicates to the BS the data components that are to be transmitted by the MT. The MT receives from the BS an activation command to activate one or more of the SPS configurations to periodically allocate radio resources for the MT to transmit each of the indicated
(Continued)

data components. The MT then transmits the one or more data components based on the radio resources and the transmission periodicity as configured by the activated one or more SPS configurations.

15 Claims, 13 Drawing Sheets

Related U.S. Application Data continuation of application No. 16/089,286, filed as application No. PCT/CN2016/078246 on Apr. 1, 2016, now Pat. No. 10,966,226.

(51) Int. Cl.
  *H04W 72/1263*   (2023.01)
  *H04W 72/23*   (2023.01)

(56) References Cited

U.S. PATENT DOCUMENTS

| | | | |
|---|---|---|---|
| 10,306,429 | B2 | 5/2019 | Kim et al. |
| 10,721,731 | B2* | 7/2020 | Lee ............... H04W 72/04 |
| 11,765,700 | B2* | 9/2023 | Ohta ............... H04W 72/51 370/336 |
| 2010/0118807 | A1* | 5/2010 | Seo ............... H04L 5/0053 370/329 |
| 2012/0275438 | A1 | 11/2012 | Dai |
| 2014/0126492 | A1 | 5/2014 | Gleixner |
| 2014/0161069 | A1 | 6/2014 | Ohta et al. |
| 2015/0264733 | A1 | 9/2015 | Guo et al. |
| 2016/0037572 | A1 | 2/2016 | Yeh et al. |
| 2016/0295624 | A1 | 10/2016 | Novlan et al. |
| 2016/0328972 | A1 | 11/2016 | Stählin et al. |
| 2016/0330728 | A1* | 11/2016 | Sorrentino ............ H04W 72/51 |
| 2017/0257803 | A1 | 9/2017 | Tenny et al. |
| 2017/0285177 | A1 | 10/2017 | Jin et al. |
| 2017/0289733 | A1 | 10/2017 | Rajagopal et al. |
| 2018/0227882 | A1 | 8/2018 | Freda et al. |
| 2018/0242190 | A1 | 8/2018 | Khoryaev et al. |
| 2018/0270812 | A1* | 9/2018 | Lee ............... H04W 72/04 |
| 2019/0045507 | A1 | 2/2019 | Sorrentino et al. |
| 2019/0116608 | A1 | 4/2019 | Kim et al. |
| 2019/0124669 | A1 | 4/2019 | Luo et al. |
| 2020/0344756 | A1 | 10/2020 | Lee et al. |

FOREIGN PATENT DOCUMENTS

| | | |
|---|---|---|
| CN | 104284340 A | 1/2015 |
| CN | 104335654 A | 2/2015 |
| CN | 104349355 A | 2/2015 |
| CN | 105430751 A | 3/2016 |
| EP | 2112845 A1 | 10/2009 |
| JP | 2010243521 A | 10/2010 |
| JP | 2013518454 A | 5/2013 |
| WO | WO 2013038525 A1 | 3/2013 |
| WO | WO 2013169173 A1 | 11/2013 |
| WO | WO 2014185836 A1 | 11/2014 |
| WO | WO 2015090999 A1 | 6/2015 |

OTHER PUBLICATIONS

3GPP TR 23.713 V13.0.0, "3rd Generation Partnership Project; Technical Specification Group Services and System Aspects; Study on extended architecture support for proximity-based services (Release 13)," Sep. 2015, 80 pages.
3GPP TS 23.303 V13.2.0, "3rd Generation Partnership Project; Technical Specification Group Services and System Aspects; Proximity-based services (ProSe); Stage 2 (Release 13)," Dec. 2015, 122 pages.
3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015, 141 pages.
3GPP TS 36.212 V13.0.0, "3rd Generation Partnership Project; Technical Specification Group Radio Access Network; Evolved Universal Terrestrial Radio Access (E-UTRA); Multiplexing and channel coding (Release 13)," Dec. 2015, 121 pages.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)," Dec. 2015, 326 pages.
3GPP TS 36.300 V13.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015, 290 pages.
3GPP TS 36.321 V13.0.0, "3rd Generation Partnership Project; Technical Specification Group Radio Access Network; Evolved Universal Terrestrial Radio Access (E-UTRA); Medium Access Control (MAC) protocol specification (Release 13)," Dec. 2015, 82 pages.
Chinese Office Action, dated Apr. 21, 2022, for Chinese Application No. 201680083840.6. (11 pages) (with English translation).
Ericsson, "Discussion on Uu Enhancements for V2X," R2-161565, 3GPP TSG-RAN WG2 #93, Agenda Item: 7.11, Malta, Feb. 15-19, 2016, 8 pages.
ETSI EN 302 637-2 V1.3.1, "Intelligent Transport Systems (ITS); Vehicular Communications; Basic Set of Applications; Part 2: Specification of Cooperative Awareness Basic Service," *European Standard*, Sep. 2014, 44 pages.
ETSI EN 302 637-3 V1.2.1, "Intelligent Transport Systems (ITS); Vehicular Communications; Basic Set of Applications; Part 3: Specifications of Decentralized Environmental Notification Basic Service," *European Standard*, Sep. 2014, 73 pages.
Extended European Search Report, dated Feb. 22, 2019, for corresponding European Application No. 16896040.9-1215/ 3437402, 9 pages.
International Search Report, dated Dec. 28, 2016, for corresponding International Application No. PCT/CN2016/078246, 2 pages.
Japanese Office Action, dated Oct. 29, 2019, for Japanese Application No. 2018-550701, 7 pages. (with English translation).
NTT Docomo, "Discussion on Resource Control and Selection for PC5 based V2V Communications," R1-161049, Agenda Item: 7.3.2.2.1, 3GPP TSG RAN WG1 Meeting #84, St Julian's, Malta, Feb. 15-19, 2016. (5 pages).
Panasonic, "Discussion on SPS mechanism supported in V2V," R1-160722, Agenda Item: 7.3.2.2.1, 3GPP TSG RAN WG1 Meeting #84, St. Julian's, Malta, Feb. 15-19, 2016, 3 pages.
English Translation of Korean Office Action dated Sep. 26, 2023, for the corresponding Korean Patent Application No. 2018-7028295, 6 pages.
Ericsson, "Sidelink Resource Allocation in V2X," Tdoc R2-161566, Agenda Item: 7.11, 3GPP TSG-RAN WG2 #93, Malta, Feb. 15-19, 2016, 10 pages.

* cited by examiner

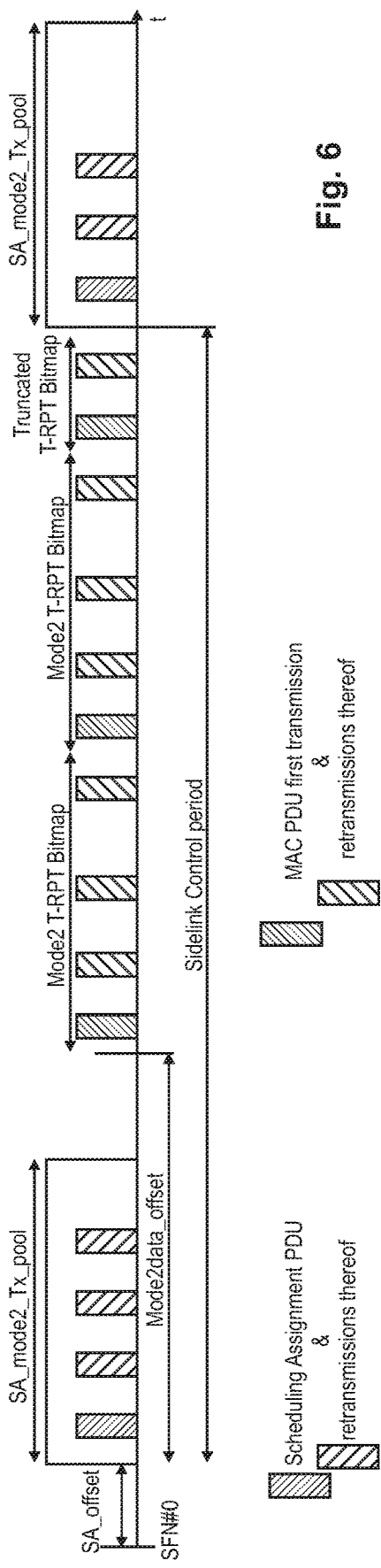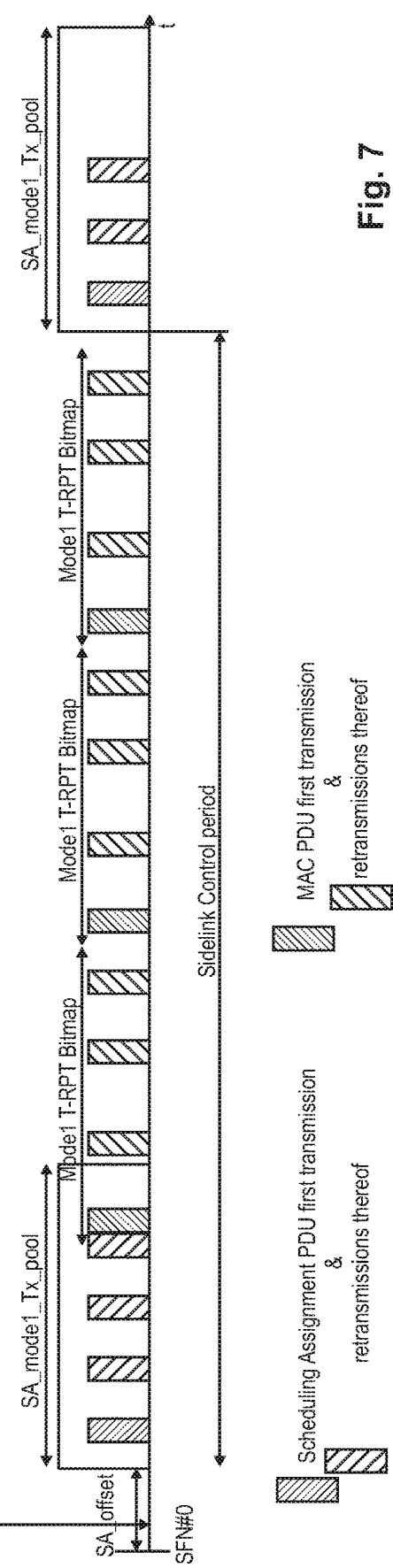

SidelinkUEInformation Message

```
-- ASN1START

SidelinkUEInformation-r12 ::=      SEQUENCE {
criticalExtensions                 CHOICE {
c1                                           CHOICE {
sidelinkUEInformation-r12          SidelinkUEInformation-r12-IEs,
spare3 NULL, spare2 NULL, spare1 NULL
},
criticalExtensionsFuture           SEQUENCE {}
}
}

SidelinkUEInformation-r12-IEs ::=  SEQUENCE {
commRxInterestedFreq-r12           ARFCN-ValueEUTRA-r9
      OPTIONAL,
commTxResourceReq-r12              SL-CommTxResourceReq-r12   OPTIONAL,
discRxInterest-r12                        ENUMERATED {true}
      OPTIONAL,
discTxResourceReq-r12              INTEGER (1..63)
      OPTIONAL,
lateNonCriticalExtension           OCTET STRING
      OPTIONAL,
nonCriticalExtension               SidelinkUEInformation-v13x0-IEs
      OPTIONAL
}

SidelinkUEInformation-v13x0-IEs ::=   SEQUENCE {
commTxResourceReq121-r13        SL-CommTxResourceReqUC-r13 OPTIONAL,
commTxResourceInfoReqRelay-r13        SEQUENCE {
commTxResourceReqRelay-r13      SL-CommTxResourceReqUC-r13,
ue-Type-r13                               ENUMERATED {relayUE,
remoteUE}
}
          OPTIONAL,
discTxResourceReq-v13x0            SEQUENCE {
carrierFreqDiscTx-r13              INTEGER (1..maxFreq),
discTxResourceReqAddFreq-r13       SL-DiscTxResourceReqPerFreqList-r13
      OPTIONAL
}
```

Fig. 16A

```
        OPTIONAL,
discTxResourceReqPS-r13               SL-DiscTxResourceReq-r13
    OPTIONAL,
discRxGapReq-r13                      SL-GapRequest-r13
    OPTIONAL,
discTxGapReq-r13                      SL-GapRequest-r13
    OPTIONAL,
discSysInfoReportList-r13             SL-SysInfoReportList-r13
    OPTIONAL,
nonCriticalExtension                  SEQUENCE {}
    OPTIONAL
}

SL-CommTxResourceReq-r12 ::=          SEQUENCE {
carrierFreq-r12                       ARFCN-ValueEUTRA-r9
    OPTIONAL,
destinationInfoList-r12               SL-DestinationInfoList-r12
}

SL-CommTxResourceReqUC-r13 ::=        SEQUENCE {
carrierFreq-r13                       ARFCN-ValueEUTRA-r9
    OPTIONAL,
destinationInfoListUC-r13             SL-DestinationInfoListUC-r13
}

SL-DiscTxResourceReqPerFreqList-r13 ::=   SEQUENCE (SIZE
(1..maxFreq)) OF SL-DiscTxResourceReq-r13

SL-DiscTxResourceReq-r13 ::=          SEQUENCE {
carrierFreq-r13                       ARFCN-ValueEUTRA-r9
    OPTIONAL,
discTxResourceReq-r13                 INTEGER (1..63)
}

SL-DestinationInfoList-r12 ::=   SEQUENCE (SIZE (1..maxSL-Dest-r12)) OF
SL-DestinationIdentity-r12

SL-DestinationIdentity-r12 ::=   BIT STRING (SIZE (24))

SL-DestinationInfoListUC-r13 ::= SL-DestinationInfoList-r12

SL-SysInfoReportList-r13 ::=     SEQUENCE (SIZE (1.. maxSL-
DiscSysInfoReportFreq-r13)) OF SL-SysInfoReport-r13
```

Fig. 16B

```
SidelinkUEInformation-v14x0-IEs::=      SEQUENCE {
commTXResourceReq121-r14    SL-CommTxResourceReq-14 OPTIONAL,
....}

SL-CommTxResourceReq-r14 ::=            SEQUENCE {
carrierFreq-r14             ARFCN-ValueEUTRA-r9    Optional
destinationInfoListUC-r14         SL-DestinationInfoList-r14
     SL-Traffic-r14               SL-TrafficList-r14    Optional
}
```

```
SL-TrafficList-r14::=          SEQUENCE (SIZE (1..maxSL-Traffic-r14))
OF SL-TrafficType-r14
```

```
SL-TrafficType-r14::=          SEQUENCE {
trafficType                    ENUMERATED {periodic, non-periodic}
periodicity                    ENUMERATED {
sf100, sf200, sf300, sf500,
sf600, sf1000, sf1200, spare10,
spare9, spare8, spare7, spare6,
spare5, spare4, spare3, spare2,
spare1},
messageSize                    INTEGER (1..300)
```

Fig. 16C

SEMI-PERSISTENT RESOURCE ALLOCATION FOR V2V TRAFFIC

BACKGROUND

Technical Field

The present disclosure relates to improved semi-persistent resource allocation between a mobile terminal and a radio base station. The present disclosure is providing the corresponding (vehicular) mobile terminal and the radio base station.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}$=110 are respectively the smallest and the largest downlink bandwidths, supported by the current version of the specification. $N_{sc}^{RB}$ is the number of subcarriers within one resource block. For normal cyclic prefix subframe structure, $N_{sc}^{RB}$=12 and $N_{symb}^{DL}$=7.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g., the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks, etc. More information on the functioning of the physical layer can be found in the 3GPP technical standard 36.213 current version 13.0.0, incorporated herein by reference.

The Radio Resource Control (RRC) layer controls communication between a UE and an eNB at the radio interface and the mobility of a UE moving across several cells. The RRC protocol also supports the transfer of NAS information. For Ues in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer. The main services and functions of the RLC sublayer include:

Transfer of upper layer PDUs supporting AM, UM or TM data transfer;
Error Correction through ARQ;
Segmentation according to the size of the TB;
Resegmentation when necessary (e.g. when the radio quality, i.e. the supported TB size changes)
Concatenation of SDUs for the same radio bearer is FFS;
In-sequence delivery of upper layer PDUs;
Duplicate Detection;
Protocol error detection and recovery;
SDU discard;
Reset The ARQ functionality provided by the RLC layer will be discussed in more detail at a later part.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.0.0 available at http://www.3gpp.org and incorporated herein by reference). For instance, the following DCI Formats can be used to carry a resource grant for the uplink.

Format 0: DCI Format 0 is used for the transmission of resource grants for the PUSCH, using single-antenna port transmissions in uplink transmission mode 1 or 2.

Format 4: DCI format 4 is used for the scheduling of the PUSCH, using closed-loop spatial multiplexing transmissions in uplink transmission mode 2.

The 3GPP technical standard TS 36.212, current version 13.0.0, defines in subclause 5.4.3, incorporated herein by reference, control information for the sidelink.

Semi-Persistent Scheduling (SPS)

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before, the CRC of a PDCCH is masked with the addressed user equipment's C-RNTI (so-called dynamic PDCCH). Only a user equipment with a matching C-RNTI can decode the PDCCH content correctly, i.e., the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are dynamically scheduled, this kind of operation is referred to as semi-persistent scheduling (SPS), i.e., resources are allocated to the user equipment on a semi-persistent basis (semi-persistent resource allocation). The benefit is that PDCCH resources for initial HARQ transmissions are saved. Semi-persistent scheduling may be used in the PCell in Release 10, but not in an SCell.

One example for a service, which might be scheduled using semi-persistent scheduling, is Voice over IP (VoIP). Every 20 ms a VoIP packet is generated at the codec during a talk-spurt. Therefore, eNodeB could allocate uplink or respectively downlink resources persistently every 20 ms, which could be then used for the transmission of Voice over IP packets. In general, semi-persistent scheduling is beneficial for services with a predictable traffic behavior, i.e., constant bit rate, packet arrival time is periodic.

The user equipment also monitors the PDCCHs in a subframe where it has been allocated resources for an initial transmission persistently. A dynamic (scheduling) grant, i.e., PDCCH with a C-RNTI-masked CRC, can override a semi-persistent resource allocation. In case the user equipment finds its C-RNTI on the L1/L2 control channel(s) in the sub-frames where the user equipment has a semi-persistent resource assigned, this L1/L2 control channel allocation overrides the persistent resource allocation for that transmission time interval, and the user equipment does follow the dynamic grant. When user equipment does not find a dynamic grant, it will transmit/receive according to the semi-persistent resource allocation.

The configuration of semi-persistent scheduling is done by RRC signaling. For example the periodicity, e.g., PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the SPS activation PDCCH every PS_PERIOD. Essentially, the user equipment stores the SPS activation PDCCH content and follows the PDCCH with the signaled periodicity.

In order to distinguish a dynamic PDCCH from a PDCCH which activates semi-persistent scheduling (also referred to as SPS activation PDCCH), a separate identity is introduced. Basically, the CRC of an SPS activation PDCCH is masked with this additional identity which is in the following referred to as SPS C-RNTI. The size of the SPS C-RNTI is also 16 bits, same as the normal C-RNTI. Furthermore, the SPS C-RNTI is also user equipment-specific, i.e., each user equipment configured for semi-persistent scheduling is allocated a unique SPS C-RNTI.

In case a user equipment detects that a semi-persistent resource allocation is activated by a corresponding SPS activation PDCCH, the user equipment will store the PDCCH content (i.e., the semi-persistent resource assignment) and apply it every semi-persistent scheduling interval, i.e., periodicity signaled via RRC. As already mentioned, a dynamic allocation, i.e., signaled on dynamic PDCCH, is only a "one-time allocation". Retransmissions of an SPS allocation are also signaled using the SPS C-RNTI. In order to distinguish the SPS activation from an SPS re-transmission, the NDI (new data indicator) bit is used. An SPS activation is indicated by setting the NDI bit to 0. An SPS PDCCH with the NDI-bit set to 1 indicates a re-transmission for an semi-persistently scheduled initial transmission.

Similar to the activation of semi-persistent scheduling, the eNodeB also can deactivate semi-persistent scheduling, also called SPS resource release. There are several options how a semi-persistent scheduling de-allocation can be signaled. One option would be to use PDCCH signaling with some PDCCH fields set to some predefined values, i.e., SPS PDCCH indicating a zero size resource allocation. Another option would be to use MAC control signaling.

In the following, further information is provided on how the eNB learns whether periodic data is transmitted by a UE and when to possibly setup the SPS configuration.

When a new bearer is established, according to the dedicated bearer activation procedure in TS 23.401, MME signals the Bearer Setup Request (EPS Bearer Identity, EPS Bearer QoS, Session Management Request, S1-TEID) message to the eNodeB. The eNodeB maps the EPS Bearer QoS to the Radio Bearer QoS. It then signals a RRC Connection Reconfiguration (Radio Bearer QoS, Session Management Request, EPS RB Identity) message to the UE.

The EPS bearer QoS profile includes the parameters QCI, ARP, GBR and MBR. Each EPS bearer (GBR and Non-GBR) is associated with the following bearer level QoS parameters:

QoS Class Identifier (QCI);
Allocation and Retention Priority (ARP).

A QCI is a scalar that is used as a reference to access node-specific parameters that control bearer level packet forwarding treatment (e.g., scheduling weights, admission thresholds, queue management thresholds, link layer protocol configuration, etc.), and that have been pre-configured by the operator owning the access node (e.g., eNodeB). A one-to-one mapping of standardized QCI values to standardized characteristics is captured TS 23.203 as illustrated in the table below which is based on the one in TS 23.203.

TABLE 1

| QCI | Resource Type | Priority Level | Packet Delay Budget | Packet Error Loss Rate (NOTE 2) | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 65 | | 0.7 | 75 ms | $10^{-2}$ | Mission Critical user plane Push To Talk voice (e.g., MCPTT) |
| 66 | | 2 | 100 ms | $10^{-2}$ | Non-Mission-Critical user plane Push To Talk voice |
| 5 | Non-GBR | 1 | 100 ms | $10^{-6}$ | IMS Signaling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) chat, ftp, p2p file sharing, progressive video, etc.) TCP-based (e.g., www, e-mail, |
| 9 | | 9 | | | |
| 69 | | 0.5 | 60 ms | $10^{-6}$ | Mission Critical delay sensitive signaling (e.g., MC-PTT signaling) |
| 70 | | 5.5 | 200 ms | $10^{-6}$ | Mission Critical Data (e.g. example services are the same as QCI 6/8/9) |

As apparent from the table, QCI value 1 corresponds to "Conversational Voice", i.e., Voice over IP (VoIP). When eNB receives "Bearer Setup Request" message with QCI value 1, eNB knows that this bearer is established for VoIP and an SPS configuration could be applied to allocate periodic resources for the UE to transmit the VoIP data.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel. 12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.2.0, defines in sub-clause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

The following rules with respect to the resource allocation mode apply for the UE:
  If the UE is out-of-coverage, it can only use Mode 2;
  If the UE is in-coverage, it may use Mode 1 if the eNB configures it accordingly;
  If the UE is in-coverage, it may use Mode 2 if the eNB configures it accordingly;
  When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;
  The UE considers itself to be in exceptional conditions e.g., while T311 or T301 is running;
  When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured, e.g., in UICC (Universal Integrated Circuit Card).

For UEs in RRC_IDLE the eNB may select one of the following options:
  The eNB may provide a Mode 2 transmission resource pool in SIB. UEs that are authorized for ProSe Direct Communication use these resources for ProSe Direct Communication in RRC_IDLE;
  The eNB may indicate in SIB that it supports D2D but does not provide resources for ProSe Direct Communication. UEs need to enter RRC_CONNECTED to perform ProSe Direct Communication transmission.

For UEs in RRC_CONNECTED:
  A UE in RRC_CONNECTED that is authorized to perform ProSe Direct Communication transmission, indicates to the eNB that it wants to perform ProSe Direct Communication transmissions when it needs to perform ProSe Direct Communication transmission;
  The eNB validates whether the UE in RRC_CONNECTED is authorized for ProSe Direct Communication transmission using the UE context received from MME;
  The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for Scheduling Assignment when the UE is out of coverage can be configured as below:
  The resource pool used for reception is pre-configured.
  The resource pool used for transmission is pre-configured.

The resource pool for Scheduling Assignment when the UE is in coverage can be configured as below:
  The resource pool used for reception is configured by the eNB via RRC, in dedicated or broadcast signaling.
  The resource pool used for transmission is configured by the eNB via RRC if Mode 2 resource allocation is used
  The SCI (Sidelink Control Information) resource pool (also referred to as Scheduling Assignment, SA, resource pool) used for transmission is not known to the UE if Mode 1 resource allocation is used.
  The eNB schedules the specific resource(s) to use for Sidelink Control Information (Scheduling Assignment) transmission if Mode 1 resource allocation is used. The specific resource assigned by the eNB is within the resource pool for reception of SCI that is provided to the UE.

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary Prose-CommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 13.0.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. A SC period is the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Tx_pool. The 1st transmission of the SA is followed, e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$, $3^{rd}$, and $4^{th}$ transmission). The SA pattern basically defines the timing of the SA's initial transmission and its retransmissions ($2^{nd}$, $3^{rd}$, and $4^{th}$ transmission).

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Mode1 T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.0.0, section 5.14, incorporated herein by reference. Therein, the Mode-2 autonomous resource selection is described in detail, differentiating between being configured with a single radio resource pool or multiple radio resource pools. The following steps are taken from said section of TS 36.321, assuming Mode-2 autonomous resource selection:

In order to transmit on the SL-SCH (sidelink shared channel) the MAC entity must have at least one sidelink grant. Sidelink grants are selected as follows:

If the MAC entity is configured by upper layers to transmit using one or multiple pool(s) of resources and more data is available in STCH (sidelink traffic channel) than can be transmitted in the current SC period, the MAC entity shall for each sidelink grant to be selected:
  if configured by upper layers to use a single pool of resources:
    select that pool of resources for use;
  else, if configured by upper layers to use multiple pools of resources:
    select a pool of resources for use from the pools of resources configured by upper layers whose associated priority list includes the priority of the highest priority of the sidelink logical channel in the MAC PDU to be transmitted;

NOTE: If more than one pool of resources has an associated priority list which includes the priority of the sidelink logical channel with the highest priority in the MAC PDU to be transmitted, it is left for UE implementation which one of those pools of resources to select.

- randomly select the time and frequency resources for SL-SCH and SCI of a sidelink grant from the selected resource pool. The random function shall be such that each of the allowed selections can be chosen with equal probability;
- use the selected sidelink grant to determine the set of subframes in which transmission of SCI and transmission of first transport block occur according to subclause 14.2.1 of TS 36.213 incorporated herein by reference (this step refers to the selection of a T-RPT and a SA pattern, as explained in connection with FIG. 7);
- consider the selected sidelink grant to be a configured sidelink grant occurring in those subframes starting at the beginning of the first available SC Period which starts at least 4 subframes after the subframe in which the sidelink grant was selected;
- clear the configured sidelink grant at the end of the corresponding SC Period;

NOTE: Retransmissions on SL-SCH cannot occur after the configured sidelink grant has been cleared.

NOTE: If the MAC entity is configured by upper layers to transmit using one or multiple pool(s) of resources, it is left for UE implementation how many sidelink grants to select within one SC period taking the number of sidelink processes into account.

The MAC entity shall for each subframe:
- if the MAC entity has a configured sidelink grant occurring in this subframe:
  - if the configured sidelink grant corresponds to transmission of SCI:
    - instruct the physical layer to transmit SCI corresponding to the configured sidelink grant.
  - else if the configured sidelink grant corresponds to transmission of first transport block:
    - deliver the configured sidelink grant and the associated HARQ information to the Sidelink HARQ Entity for this subframe.

NOTE: If the MAC entity has multiple configured grants occurring in one subframe and if not all of them can be processed due to the single-cluster SC-FDM restriction, it is left for UE implementation which one of these to process according to the procedure above.

The above text taken from the 3GPP technical standard can be clarified further. For example, the step of randomly selecting the time and frequency resources is random as to which particular time/frequency resources are chosen but is, e.g., not random as to the amount of time/frequency resources selected in total. The amount of resources selected from the resource pool depends on the amount of data that is to be transmitted with said sidelink grant to be selected autonomously. In turn, the amount of data that is to be transmitted depends on the previous step of selecting the ProSe destination group and the corresponding amount of data ready for transmission destined to said ProSe destination group. As described later in the sidelink LCP procedure, the ProSe destination is selected first.

Furthermore, the sidelink process associated with the sidelink HARQ entity is responsible for instructing the physical layer to generate and perform a transmission accordingly, as apparent from section 5.14.1.2.2 of 3GPP TS 36.321 v13.0.0, incorporated herein by reference. In brief, after determining the sidelink grant and the sidelink data to transmit, the physical layer takes care that the sidelink data is actually transmitted, based on the sidelink grant and the necessary transmission parameters.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
- Exchange of ProSe control information between ProSe-enabled UE and the ProSe Function over PC3 reference point.
- Procedures for open ProSe Direct Discovery of other ProSe-enabled UEs over PC5 reference point.
- Procedures for one-to-many ProSe Direct Communication over PC5 reference point.
- Procedures to act as a ProSe UE-to-Network Relay. The Remote UE communicates with the ProSe UE-to-Network Relay over PC5 reference point. The ProSe UE-to-Network Relay uses layer-3 packet forwarding.
- Exchange of control information between ProSe UEs over PC5 reference point, e.g., for UE-to-Network Relay detection and ProSe Direct Discovery.
- Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
- Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

Vehicular Communication—V2X Services

A new study item has been set up in the 3GPP to consider the usefulness of new LTE features to the automotive industry—including Proximity Service (ProSE) and LTE-based broadcast services. ProSe functionality is thus considered as offering a good foundation for the V2X services. Connected vehicle technologies aim to tackle some of the biggest challenges in the surface transportation industry, such as safety, mobility, and traffic efficiency.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:

V2V: covering LTE-based communication between vehicles.

V2P: covering LTE-based communication between a vehicle and a device carried by an individual (e.g., handheld terminal carried by a pedestrian, cyclist, driver or passenger).

V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The UE supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

With regard to V2I communication, the UE supporting V2I applications sends application layer information to the Road Side Unit, which in turn can send application layer information to a group of UEs or a UE supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

Different types of messages are and will be defined for the V2V communication. Two different types of messages have been already defined by ETSI for the Intelligent Transport Systems (ITS), see corresponding European Standards ETSI EN 302 637-2 v1.3.1 and ETSI EN 302 637-3 v 1.2.1:

Cooperative Awareness Messages (CAM), which are continuously triggered by vehicle dynamics to reflect the vehicle status.

Decentralized Environmental Notification Messages (DENM), which are triggered only when vehicle-related safety events occur.

As the V2V and ITS standardizations are rather at the beginning, it is to be expected that other messages might be defined in the future.

CAMs are continuously broadcast by ITS-Stations (ITS-S) to exchange status information with other ITS-Ss, and thus have a larger impact on the traffic load than event-triggered DENM messages. For this reason, traffic characteristics of CAM messages as defined by ETSI for ITS are considered more representative of V2V traffic.

Cooperative Awareness Messages (CAMs) are messages exchanged in the ITS network between ITS-Ss to create and maintain awareness of each other and to support cooperative performance of vehicles using the road network. Point to multipoint communication shall be used for transmitting CAMs, such that the CAMs are transmitted from the originating ITS-S to the receiving ITS-Ss located in the direct communication range of the originating ITS-S. CAM generation shall be triggered and managed by the Cooperative Awareness basic service, which defines the time interval between two consecutive CAM generations. At present, the upper and lower limits of the transmission interval are 100 ms (i.e., CAM generation rate of 10 Hz) and 1000 ms (i.e., CAM generation rate of 1 Hz). The underlying philosophy of ETSI ITS is to send CAMs when there is new information to share (e.g., new position, new acceleration or new heading values). Correspondingly, when the vehicles are moving slowly and on constant heading and speed, a high CAM generation rate brings no real benefit at the CAMs only display minimal differences. The transmission frequency of CAMs of one vehicle varies between 1HZ to 10 Hz as a function of the vehicle dynamics (e.g., speed, acceleration, and heading). For instance, the slower the vehicle drives, the less number of CAMs are triggered and transmitted. Vehicle speed is the main impacting factor on CAM traffic generation, The CAM generation trigger conditions are currently defined in ETSI EN 302 637-2 v1.3.1 clause 6.1.3 and shown below:

1) The time elapsed since the last CAM generation is equal to or greater than T_GenCam_Dcc (a parameter providing the minimum time interval between two consecutive CAM generations in order to reduce the CAM generation according to the channel usage requirements of decentralized congestion control (DCC) and one of the following ITS-S dynamics related conditions is given:

the absolute difference between the current heading of the originating ITS-S and the heading included in the CAM previously transmitted by the originating ITS-S exceeds 4°;

the distance between the current position of the originating ITS-S and the position included in the CAM previously transmitted by the originating ITS-S exceeds 4 m;

the absolute difference between the current speed of the originating ITS-S and the speed included in the CAM previously transmitted by the originating ITS-S exceeds 0.5 m/s.

2) The time elapsed since the last CAM generation is equal to or greater than T_GenCam and equal to or greater than T_GenCam_Dcc. The parameter T_GenCam represents the currently valid upper limit of the CAM generation interval.

If one of the above two conditions are satisfied, a CAM shall be generated immediately.

A CAM contains status and attributes information of the originating ITS-S. The content of CAMs varies depending on the type of the ITS-S, as will be explained in more detail below. For vehicle ITS-Ss the status information may include time, position, motion state, activated systems, etc., and the attribute information may include data about the dimensions, vehicle type and role in the road traffic, etc. Upon reception of a CAM, the receiving ITS-S becomes aware of the presence, type, and status of the originating ITS-S. The received information can be used by the receiving ITS-S to support several ITS applications. For example, by comparing the status of the originating ITS-S with its own status, a receiving ITS-S is able to estimate the collision risk with the originating ITS-S and if necessary may inform the driver of the vehicle via the HMI (Human Machine Interface). As described in detail in clause 7 of ETSI EN 302 637-2 v 1.3.1, incorporated herein by reference, a CAM is composed of one common ITS PDU header and multiple containers, which together constitute a CAM. The ITS PDU header is a common header that includes the information of the protocol version, the message type and the ITS-S ID of the originating ITS-S. For vehicle ITS-Ss a CAM shall comprise one basic container and one high-frequency container, and may also include one low-frequency container and one or more other special containers. The basic container includes the basic information related to the originating ITS-S. The high-frequency container contains highly dynamic information of the originating ITS-S. The low-frequency container contains static and not highly dynamic information of the originating ITS-S. The special vehicle container contains information specific to the vehicle role of the originating vehicle ITS-S. The general structure of a CAM is illustrated in FIG. 9.

The following table gives an overview and packet sizes of the different components of the V2V message data:

TABLE 2

| Data Elements | Type | Typical Size (Bytes) | Description |
| --- | --- | --- | --- |
| Header | Mandatory | 8 | Protocol version, message type, sender address, and time stamp |
| Basic Container | Mandatory | 18 | Station type (e.g., lightTruck, cyclist, pedestrians, etc.) and position |
| High-Frequency (HF) Container | Mandatory | 23 | All fast-changing status information of the vehicle, i.e., heading, speed, acceleration, etc. |
| Low-Frequency (LF) Container | Optional | 60 | Static or slow-changing vehicle data, mainly path history. The path history is made up of a number of path history points. 7 path history points are sufficient to cover over 90% cases based on extensive testing. Each point is approximately 8 bytes. |
| Special Vehicle Container | Optional | 2~11 | Specific vehicles role in road traffic (e.g., public transport, vehicles realizing a rescuing operation, etc.). |

The vehicle ITS-S generates CAMs that shall include at least a high-frequency vehicle container, and optionally a low-frequency vehicle container. Vehicle ITS-Ss which have a specific role in road traffic, such as public transport shall provide for the status information in special vehicle containers.

Each V2V message exchanged between vehicles has to satisfy security requirements, including anonymity and integrity protection. Different security schemes can have different security performances and levels of overhead, which have direct impacts on the packet size (due to the security overhead) and message frequency (e.g., how often a security certificate is attached).

Both ETSI ITS and IEEE 1609.2 consider public key infrastructure (PKI)-based security solutions for V2X communications, which is an asymmetric-based application-layer security solution. Typically, every V2X message needs to carry a signature, as well as either a certificate or a certificate's digest to achieve anonymity and integrity protection. Typical sizes for signature, digest, and certificate are 64 bytes, 8 bytes, and 117 bytes, respectively.

As explained above, the CAM messages may have different periodicities and/or different message sizes. Further, the periodicities may even change over time depending on speed and other (less impacting) factors such as heading or angle. In order to provide an overview, the following tables are provided identifying the different possible message components (HF, LF, certificate) and the resulting periodicities and message sizes depending on three different typical speed ranges.

TABLE 3

CAM With PKI-Based Security Overhead (for vehicle speed >144 km/h):

| Component | Distribution | Parameters |
| --- | --- | --- |
| CAM HF Component Transmission Frequency (including signature and digest) | Deterministic | 10 Hz (or every 100 ms) |
| CAM LF Component Transmission Frequency | Deterministic | 2 Hz (or every 500 ms) |
| Certificate Transmission Frequency | Deterministic | 1 Hz (or every 1000 ms) |
| CAM HF Component Size (including signature and digest) | Deterministic | 122 Bytes |
| CAM LF Component Size | Deterministic | 60 Bytes |
| Certificate Size | Deterministic | 117 Bytes |

TABLE 4

CAM With PKI-Based Security Overhead (speed ∈[72, 144] km/h)

| Component | Distribution | Parameters |
| --- | --- | --- |
| CAM HF Component Transmission Frequency (including signature and digest) | Deterministic | 5 Hz (or every 200 ms) |
| CAM LF Component Transmission Frequency | Deterministic | 1.67 Hz (or every 600 ms) |
| Certificate Transmission Frequency | Deterministic | 1 Hz (or every 1000 ms) |
| CAM HF Component Size (including signature and digest) | Deterministic | 122 Bytes |
| CAM LF Component Size | Deterministic | 60 Bytes |
| Certificate Size | Deterministic | 117 Bytes |

TABLE 5

CAM With PKI-Based Security Overhead (speed ∈[48, 72] km/h)

| Component | Distribution | Parameters |
| --- | --- | --- |
| CAM HF Component Transmission Frequency (including signature and digest) | Deterministic | 3.33 Hz (or every 300 ms) |
| CAM LF Component Transmission Frequency | Deterministic | 1.67 Hz (or every 600 ms) |
| Certificate Transmission Frequency | Deterministic | 0.83 Hz (or every 1200 ms) |
| CAM HF Component Size (including signature and digest) | Deterministic | 122 Bytes |
| CAM LF Component Size | Deterministic | 60 Bytes |
| Certificate Size | Deterministic | 117 Bytes |

As apparent from the above table, the size of the components and thus of the CAMs stays the same but their generation/transmission frequency changes with the different speed ranges. For the above table, the CAM HF component is assumed to be transmitted together with a signature and digest, resulting in a message size of approximately 122 bytes (i.e., enough to transport 8 bytes for the header, 18 bytes for the basic container, 23 bytes for the high-frequency container, 64 bytes for the signature and 8 bytes for the digest). A CAM LF component, which is piggybacked on the high-frequency component, approximately has a size of an additional 60 bytes such that the resulting CAM size with all containers/components is 182 bytes. A certificate component (also termed security component), piggybacked on the high-frequency component, approximately has a size of an additional 117 bytes, such that the resulting CAM size with all containers/components is 299 bytes or without the CAM LF container/component is 239 bytes.

FIG. 10 illustrates the occurrence of the three different components depending on the above-introduced three different speed ranges and how this results in different overall message sizes and overall periodicities. In FIG. 10 a dashed square, comprising the different components, shall indicate that the components are not transmitted separately but as one CAM message.

In the above, the periodic Cooperative Awareness messages have been described in great detail, also specifying their differing content, particular periodicities and message sizes. However, it should be noted that although some of the above information has already been standardized, other information, such as the periodicities and the message sizes, are not standardized yet and are based on assumptions. Furthermore, the standardization might change in the future and thus might also change aspects of how the CAMs are generated and transmitted. Furthermore, although at present the different components discussed above (CAM HF, CAM LF, certificate) are transmitted together, i.e., as one message, when they fall together, this does not have to necessarily the case. In the future it might also be possible to transmit these containers/components separately from one another, then probably respectively including the Header and maybe the basic container too. Consequently, the above detailed description of the CAMs should be understood as an example conceived for illustration purposes although the message sizes and periodicities are realistic and based on simulation results. The above-described CAM message and their content, periodicities and message sizes will be used throughout this application in order to explain the underlying principles of the disclosure. What is important for the disclosure is that V2V communication will require a vehicular UE to transmit different data in a periodic way, and it is foreseeable that the periodicity may quickly change as a function of vehicle dynamics such as (relative) speed, angles, heading, and possibly other factors such as vehicle distance, etc. Consequently, a challenge is that a vehicular UE shall be able to transmit several periodic packets of different message sizes with different and varying periodicities.

In order to the vehicular UE to have radio resources on the site link to transmit the CAMs, Mode1 and/or Mode2 radio resource allocation are envisioned as explained above. For Mode 1 radio resource allocation, the eNB allocates resources for the SA message and data for each SA period. However, when there is a lot of traffic (e.g., high-frequency periodic traffic), the overhead on the Uu link from UE to the eNB could be big.

As apparent from the above, a lot of V2V traffic is periodical, such that the 3GPP has agreed that for sidelink V2V communication Mode 1 (i.e., eNB scheduled radio resource allocation), sidelink semi-persistent radio resource allocation will be supported by eNBs and UEs.

However, the currently standardized semi-persistent allocation mechanism needs to be improved and adapted to the requirements and challenges of V2V traffic.

BRIEF SUMMARY

Non-limiting and exemplary embodiments provide an improved resource allocation method for vehicular communication for a vehicular mobile terminal.

The independent claims provide non-limiting and exemplary embodiments. Advantageous embodiments are subject to the dependent claims.

Correspondingly, in one general first aspect, the techniques disclosed here feature a vehicular mobile terminal for transmitting periodic data to one or more receiving entities. The vehicular mobile terminal supports transmission of the periodic data comprising one or more different data components to be transmitted with different possible transmission periodicities and/or different possible message sizes. A transmitter of the vehicular mobile terminal transmits information on the periodic data to a radio base station responsible for allocating radio resources to the vehicular mobile terminal. The transmitted information on the periodic data is such that it allows the radio base station to determine the different possible transmission periodicities and/or the different possible message sizes of the one or more data components of the periodic data. A receiver of the vehicular mobile terminal receives from the radio base station a plurality of semi-persistent radio resource configurations configured by the radio base station based on the received information on the periodic data. Each of the plurality of semi-persistent radio resource configurations is configured for being usable to transmit at least one of the supported data components. The transmitter then indicates to the radio base station that one or more of the data components are to be transmitted by the vehicular mobile terminal. The receiver receives from the radio base station an activation command to activate one or more of the plurality of semi-persistent radio resource configurations to periodically allocate radio resources for the vehicular mobile terminal to transmit each of the indicated data components. The transmitter then transmits the one or more data components to the one or more receiving entities based on the radio resources and the transmission periodicity as configured by the activated one or more semi-persistent radio resource configurations.

Correspondingly, in one general first aspect, the techniques disclosed here feature a radio base station for allocating radio resources to a vehicular mobile terminal for transmitting periodic data to one or more receiving entities. The vehicular mobile terminal supports transmission of the periodic data comprising one or more different data components to be transmitted with different possible transmission periodicities and/or different possible message sizes. A receiver of the radio base station receives from the vehicular mobile terminal information on the periodic data to be transmitted by the vehicular mobile terminal to the one or more receiving entities. A processor of the radio base station determines the different supported data components and the different possible transmission periodicities and/or the different possible message sizes of the one or more data components. The processor configures a plurality of semi-persistent radio resource configurations based on the determined transmission periodicities and/or on the determined message size. Each of the plurality of semi-persistent radio resource configurations is configured for being usable to transmit at least one of the supported data components. A transmitter of the radio base station transmits information on the configured plurality of semi-persistent radio resource configurations to the vehicular mobile terminal. The receiver receives, from the vehicular mobile terminal, an indication that one or more of the data components are to be transmitted by the vehicular mobile terminal. The processor then selects one or more among the plurality of semi-persistent radio resource configurations to be activated for the vehicular mobile terminal to periodically allocate radio resources for the vehicular mobile terminal to transmit each of the indicated data components. The transmitter further configured to transmit an activation command to the vehicular mobile terminal to activate the selected one or more semi-persistent radio resource configurations for the vehicular mobile terminal.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 6 illustrates the D2D communication timing for the UE-autonomous scheduling Mode 2, FIG. 7 illustrates the D2D communication timing for the eNB-scheduled scheduling Mode 1.

FIGS. 16A, 16B and 16C show an exemplary extended SidelinkUEInformation message according to one embodiment of the invention.

DETAILED DESCRIPTION

Figure 1:
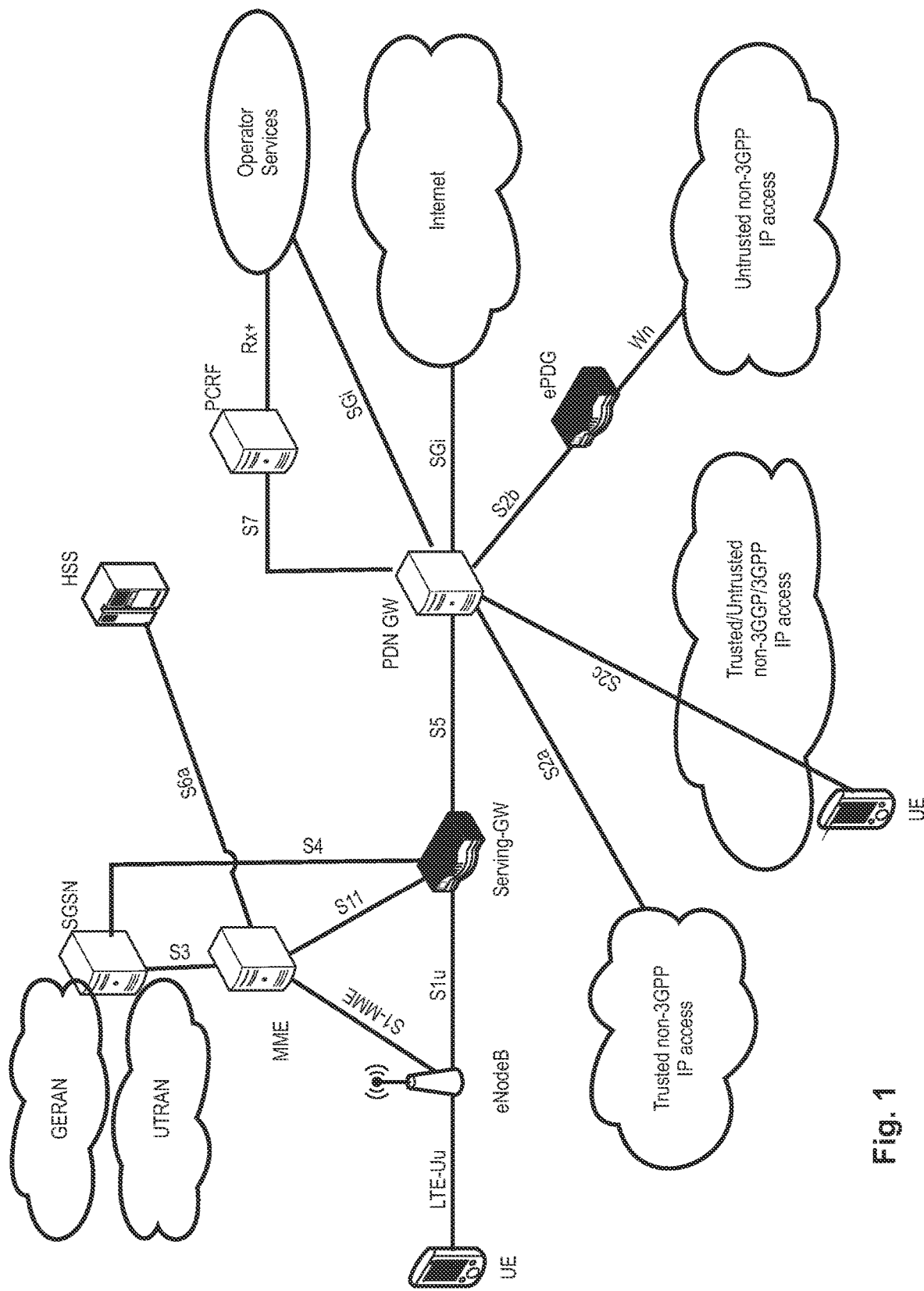
FIG. 1 shows an exemplary architecture of a 3GPP LTE system.
Figure 2:
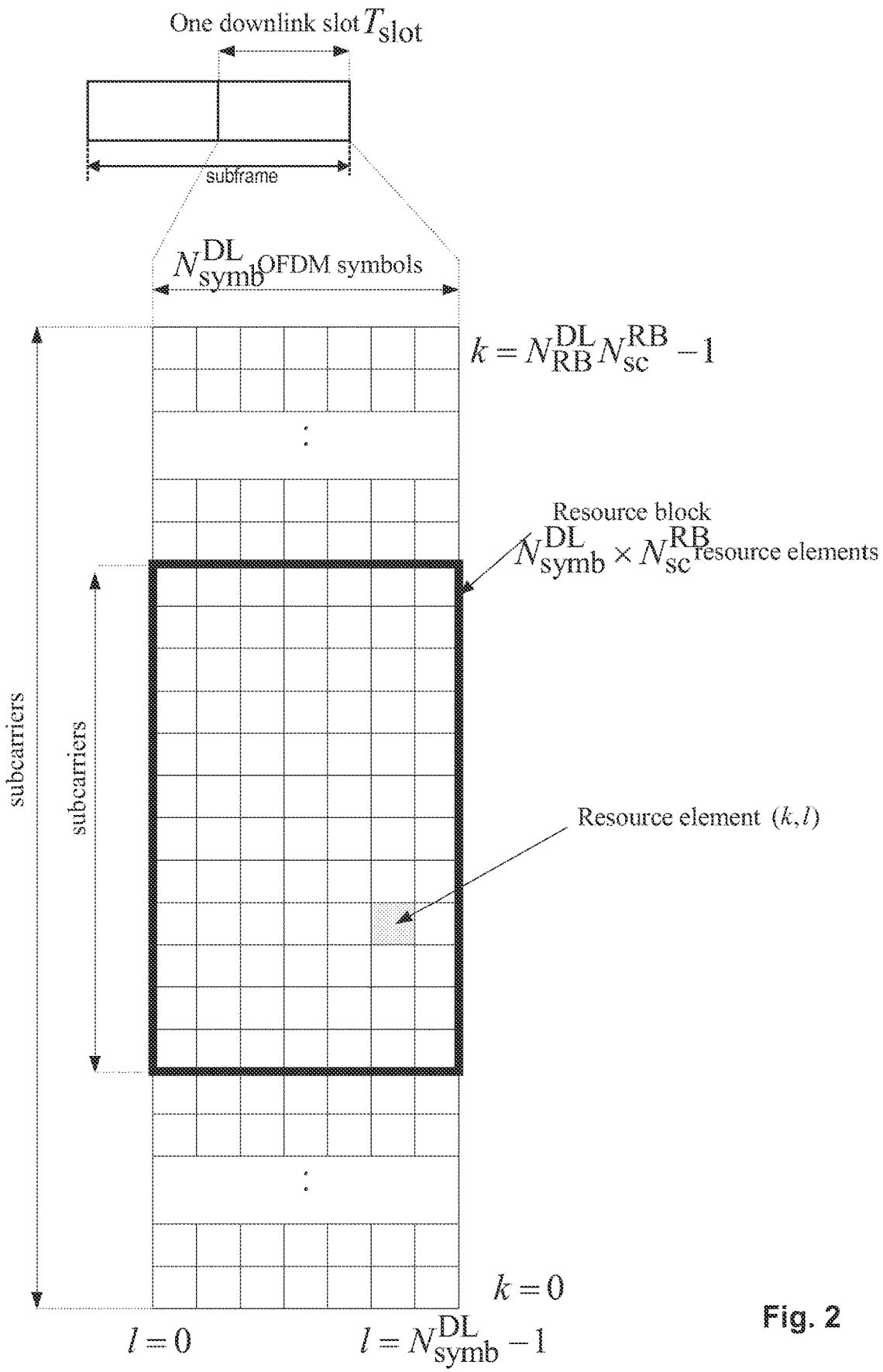
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
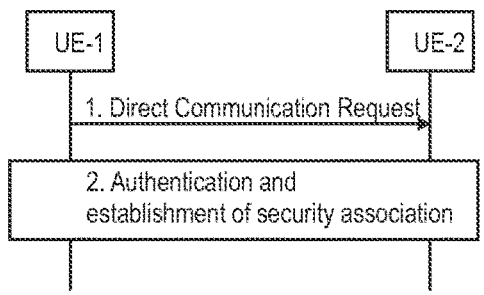
Figure 4:
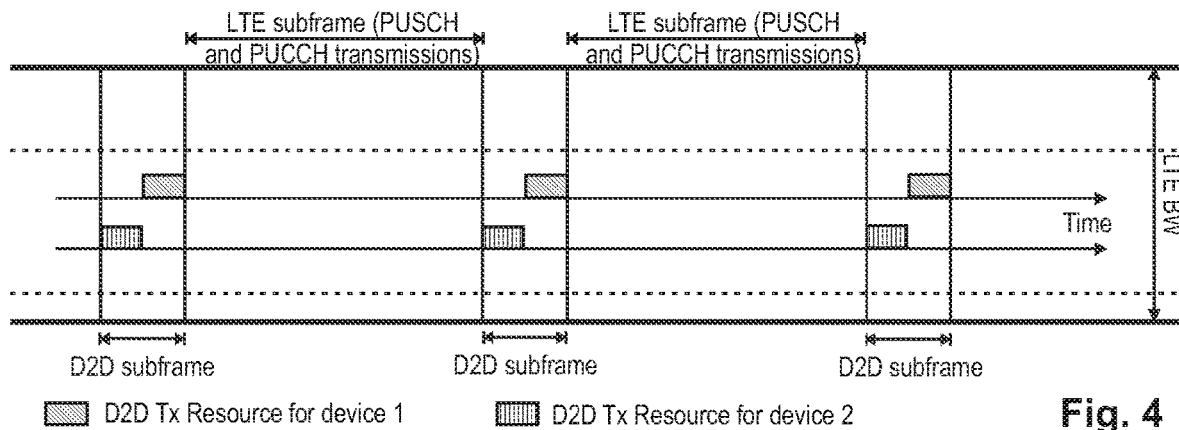
FIG. 4 illustrates the use of transmission/reception resources for overlay (LTE) and underlay (D2D) systems.
Figure 5:
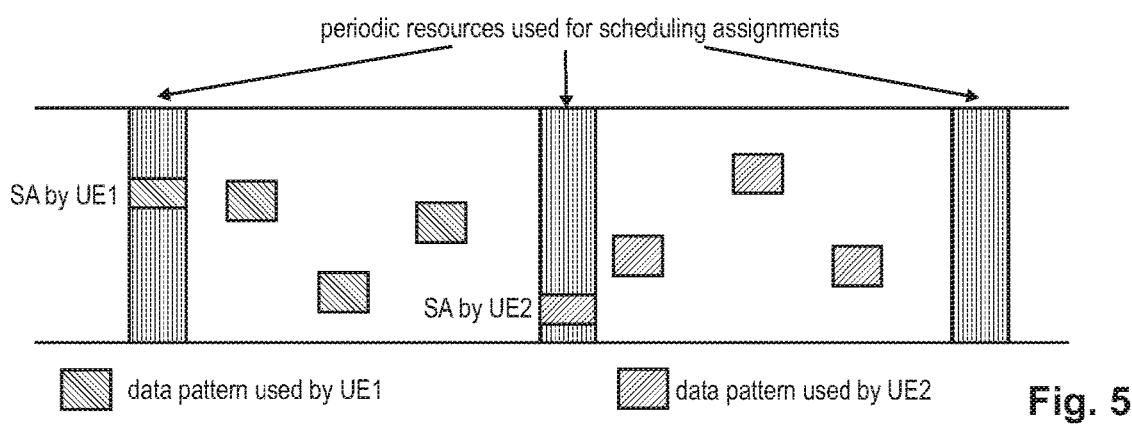
FIG. 5 illustrates the transmission of the Scheduling Assignment and the D2D data for two UEs.
Figure 8:
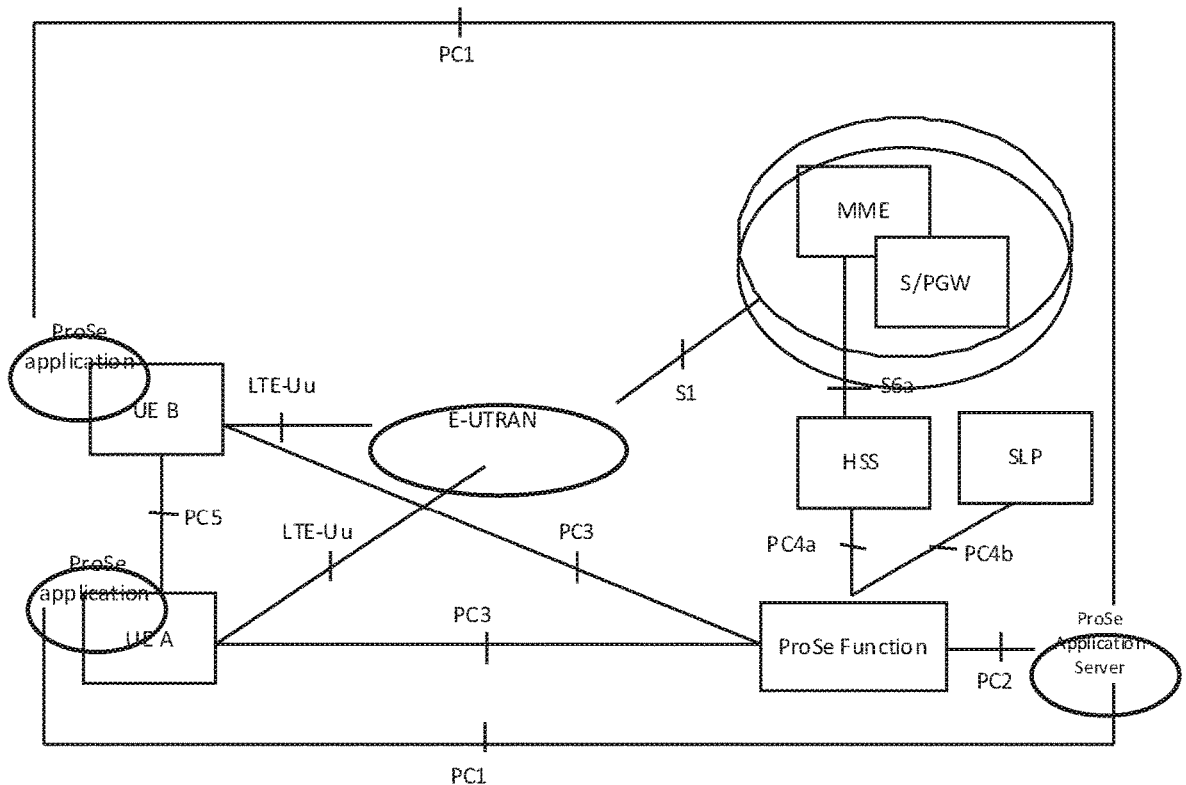
FIG. 8 illustrates an exemplary architecture model for ProSe for a non-roaming scenario.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" is to be broadly understood and can be understood in the 3GPP context as the PC5 interface described in the background section.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item V2X (vehicular communication) as explained in the background section. Correspondingly, a vehicular mobile terminal shall be broadly understood as a mobile terminal which is specifically installed in a vehicle (e.g., car, commercial trucks, motorcycles, etc.) to perform vehicular communication, i.e., passing information related to the vehicle to other entities (such as vehicles, infrastructure, pedestrians), e.g., for the purpose of safety or driver assistance. Optionally, the vehicular mobile terminal may have access to information available at the navigation system (provided it is also installed in the car), such as map information, etc.

As explained in the background section, 3GPP has introduced a new study item for LTE-assisted vehicular communication, which shall be based on ProSe procedures to exchange V2V traffic between the various vehicular mobile terminals and other stations. Furthermore, semi-persistent radio resource allocation shall be supported by V2V traffic for Mode 1 sidelink allocation so as to reduce the amount of scheduling to perform by the eNB. However, current SPS mechanisms are not adapted to V2V traffic and its characteristics. For instance, for the usual semi-persistent scheduling on the Uu link (i.e., between eNB and UE), the eNB receives QCI information (QoS class identifier) from an MME (Mobility Management Entity). The QCI information indicates that a certain bearer configured between the eNB and the UE is configured to transport VoIP traffic, such that the eNB learns about the periodic traffic generated by the UE on that bearer. The eNB can then configure a semi-persistent radio resource allocation for the UE, by sending an RRC signaling to the UE to configure the SPS periodicity. Then, when the UE needs to actually transmit VoIP data over that bearer and transmits a corresponding Buffer Status Report indicating that there is data to be transmitted for VoIP traffic, the eNB would send a PDCCH to the UE to activate the SPS configuration wherein the PDCCH message also indicates which radio resources the UE is allowed to periodically use (thus allocating a particular amount of radio resources). Correspondingly, the UE uses the SPS resources for periodically transmitting the VoIP traffic.

However, the eNB does not have knowledge of the traffic type (e.g., periodicity or message size) that would be transmitted by a particular vehicular UE over the sidelink connection, such that it cannot properly determine the amount of resources to allocate through the semi-persistent radio resource allocation nor the periodicity of these semi-persistent radio resources.

Even if the eNB would somehow receive information about traffic to be transmitted by a vehicular UE, it should be noted that the vehicular UE will have to transmit V2V traffic having different periodicities and/or different message sizes, which is significantly different from the VoIP traffic type for which the current SPS mechanism was designed. Furthermore, the periodicity with which the V2V traffic is to be transmitted is variable as it may change, e.g., depending on vehicle dynamics such as the speed with which the vehicle travels. Therefore, the currently standardized SPS mechanism is deficient to cope with these different V2V usage scenarios.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above (or later releases), but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

The various embodiments mainly provide an improved semi-persistent resource allocation procedure between a (vehicular) UE and the eNB responsible to allocate radio resources to the (vehicular) UE. Therefore, other functionality (i.e., functionality not changed by the various embodiments) may remain exactly the same as explained in the background section or may be changed without any consequences to the various embodiments. This includes, e.g., other procedures relating to how the actual transmission of the periodic data is performed by the vehicular UE after the vehicular UE is allocated with suitable semi-persistent radio resources.

First Embodiment

In the following a first embodiment for solving the above-mentioned problem(s) will be described in detail. Different implementations and variants of the first embodiment will be explained as well.

Exemplarily, a vehicular UE is assumed which is installed in a vehicle and is capable of performing vehicular communication based on the D2D framework as explained in the background section of this application. However, as will be explained in more detail later, the principles underlying the disclosure are not restricted to be merely applied by vehicular UEs, but may also be implemented by usual (i.e., non-vehicular) UEs which are for example transmitting periodic data via the Uu interface to the eNB or via the PC5 interface (sidelink connection) to other UE(s). Nonetheless, for the following discussion it is assumed that it is a vehicular UE which needs to periodically transmit V2V data.

It is further assumed that the vehicular UE transmits (broadcasts) the periodic data destined to other (vehicular) UEs, although it might also be possible that the periodic data is transmitted to other (vehicular) UEs (via the PC5 interface), its eNB (via the Uu interface), Road Side Units (possibly via the PC5 interface) and/or other suitable stations for which the periodic data transmitted by the vehicular UE is of interest; the transmission from the vehicular UE can be assumed to be point-to-multipoint thus reaching all receiving entities in its area.

The periodic data to be transmitted by the vehicular UE will be exemplified by the Cooperative Awareness Messages (CAMs) explained in detail in the background section. The characteristics of the CAMs that are relevant to the disclosure are that CAMs are transmitted in a periodic fashion. However, CAMs are significantly different from the usual VoIP usage scenario of semi-persistent scheduling scenarios in that there are different and even varying transmission periodicities and/or different message sizes (i.e., the amount of data that is to be transmitted and for which the vehicular UE needs radio resources). VoIP exhibits a fixed periodicity and fixed message size that may well be handled by a semi-persistent radio resource allocation.

It should be noted that CAMs are merely an example of such periodic data, and that the disclosure may be applied to other data types as well that might be standardized in the future for vehicular or non-vehicular communication. Especially for the vehicular communication it is likely that a vehicular UE may have to periodically broadcast (status and attribute) data at different and/or even varying periodicities, and thus may have to transmit at different time instances messages with more or less data due to the different periodicities.

As will explained in detail below, the CAM messages are a fitting example of this kind periodic data and will thus be used to explain the first embodiment and its variants, although the disclosure is not restricted thereto as just mentioned.

Figure 10:
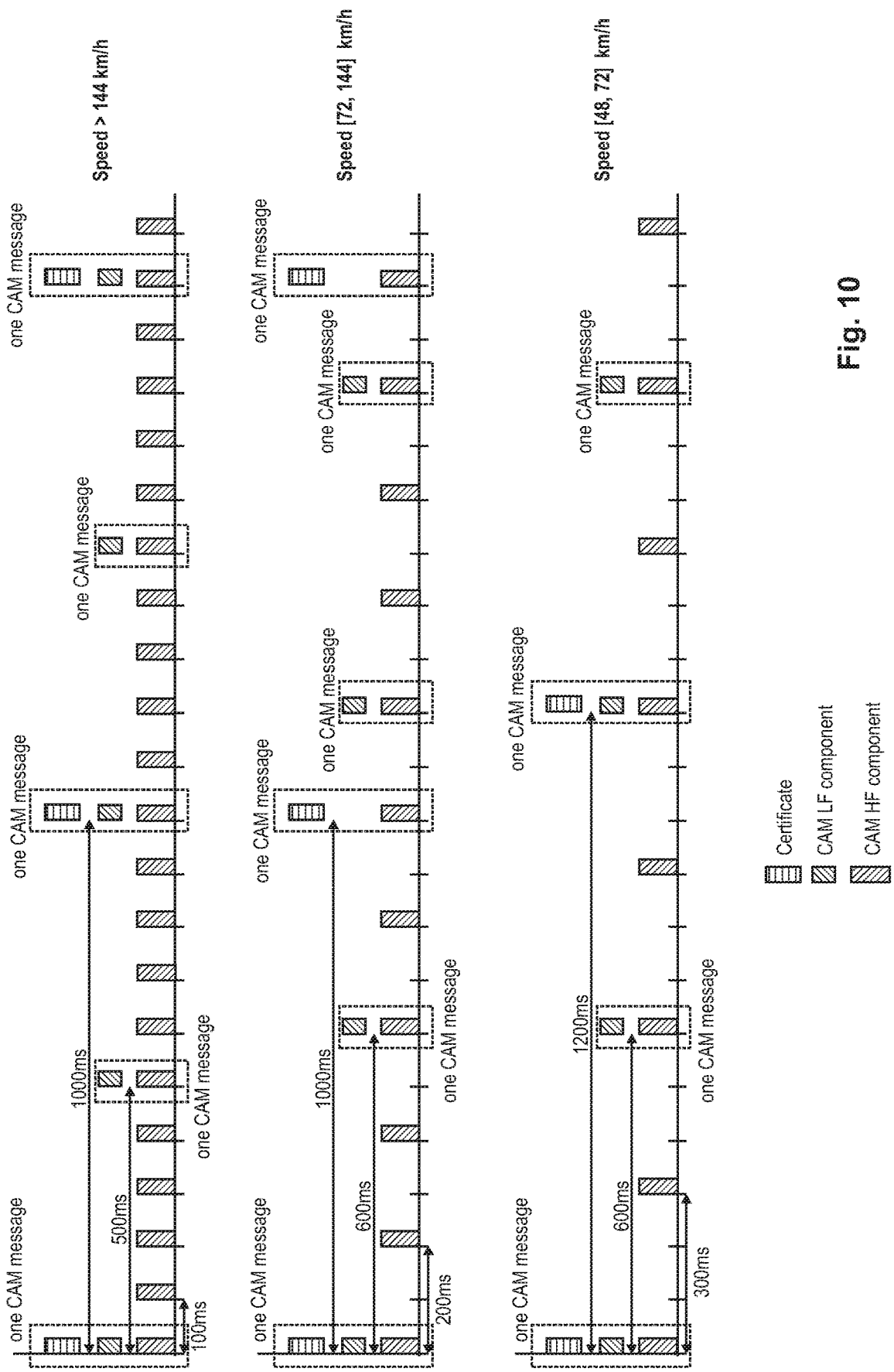
FIG. 10 illustrates the transmission of several different CAM components, with varying periodicities and message sizes, for three different speed ranges.

There are different CAM components (e.g., CAM HF, CAM LF, certificate will be the CAM components based on which of the disclosure will be explained in the following) which need to be periodically broadcast by a vehicular UE but with different periodicities. It is mostly assumed in the following that at a particular time instance only one CAM message is transmitted/broadcast by the vehicular UE, said CAM message however comprising the different CAM components that are due to be transmitted at that time instance (i.e., CAM components that concur at that time instance despite having different periodicities). In other words, in case different CAM components are to be transmitted by the vehicular UE at the same time (SC period on the PC5 interface, the different CAM components are piggybacked together to form a single CAM message which is then transmitted. For the piggybacking to actually work, the periodicities of the different CAM components need to be coordinated (i.e., be multiples of each other) such that the different CAM components indeed conquer at particular same time instances. The single CAMs are thus transmitted in a periodic fashion, with a single periodicity (which is given by the highest transmission rate of the CAM components to be transmitted (e.g., the CAM HF component) but with different content and thus message size (i.e., different CAM components are comprised in the single CAM messages at different time instances) were in the different message sizes also varies periodically (see, e.g., FIG. 10 and related description). The radio resource allocation mechanism thus needs to allocate a different amount of radio resources at different time instances.

Figure 9:
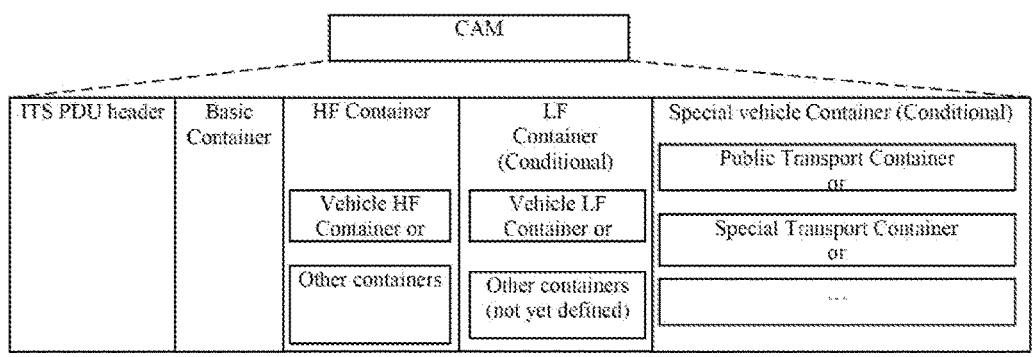
FIG. 9 illustrates an exemplary composition of a CAM message.

Alternatively, it is also possible that the different CAM components having the different periodicities are transmitted as separate CAM messages. This might be disadvantageous in view of that more radio resources are needed since each of the separate CAM messages might need to include at least the header and possibly also the basic container (see FIG. 9 and related description) which is avoided in the first alternative by piggybacking the CAM components together. However, providing separate CAM messages has the advantage that avoids the need to coordinate the different periodicities of the respective CAM components may be avoided, i.e., that the periodicities of the respective CAM components may be freely defined. In this case, the CAM messages have different periodicities and different message sizes.

It should be noted, that the 3GPP standardization has not yet fully agreed on the transmission rate of the different CAM components, on whether or not piggybacking will be optional or mandatory, or on how exactly the different CAM components will be transmitted. In any case, this might also change in future releases. The principles underlying the disclosure are applicable to any of these cases, even though slight adaptations may have to be applied to account for these changes.

In the following it will be mainly assumed that at a particular time instance only one CAM message is transmitted by the vehicular UE, meaning that the different CAM components will form a single CAM message.

Furthermore, it is expected that the required transmission periodicity of the CAM components may quickly change over time as a function of vehicle dynamics such as speed, heading, and/or angle; possibly other factors may be defined in the future.

In summary, a (vehicular) UE will transmit periodic data (e.g., CAMs) to other receiving entities (e.g., other vehicular stations). In order to transmit to the periodic data, the vehicular UE needs radio resources which may be, e.g., allocated by the eNodeB, e.g., according to the ProSe Mode 1 radio resource allocation as explained in the background section. According to the first embodiment, the eNodeB allocates semi-persistent radio resources to the vehicular UE to thereby allow the vehicular UE to transmit periodically the pending periodic data.

To already provide a brief overview, the first embodiment may conceptually be divided into a preparation phase and an execution phase. In the preparation phase, different SPS configurations will be configured by the eNodeB for the later transmission of the periodic data that is supported by the vehicular UE and that may thus be transmitted by the vehicular UE in the future. The vehicular UE will be configured with various different SPS configurations that may be activated during the execution phase as needed. The execution phase may be assumed to begin when transmission of part or all of the supported periodic data by the vehicular UE begins. Correspondingly, specific SPS configurations, among the previously prepared SPS configurations, are activated in the UE and then used by the vehicular UE to transmit the pending periodic data. During the execution phase either the message size or the periodicities of the pending periodic data may change such that different SPS configurations, among the previously prepared SPS configurations, have to be activated in the vehicular UE so as to still be able to transmit the periodic data at the different periodicity or with the different message size(s).

The preparation phase will now be explained in more detail. In order for the eNodeB to be able to set up suitable SPS configuration(s) for the periodic data supported by the UE, the eNodeB needs to about the periodic data that may be transmitted by the vehicular UE in the future. Typically, an SPS configuration allocates in a periodic fashion (i.e., at periodic time instances) a particular amount of radio resources which in turn depends on the amount of data that the UE needs to transmit (e.g., the size of the CAM message). Correspondingly, the vehicular UE transmits information on the periodic data to the eNodeB such that the eNodeB is able to determine the one or more different possible periodicities and/or the different possible message sizes that may be transmitted by the vehicular UE in the future. Having learned this information, the eNodeB is then able to configure a plurality of different SPS configurations in such a way that by later activating one or more of these SPS configurations for the vehicular UE, the vehicular UE is enabled to actually transmit one or more of the supported periodic data using the radio resources periodically allocated by the activated SPS configurations.

After having thus set up the plurality of SPS configurations, the eNodeB provides corresponding information on the plurality of SPS configurations to the vehicular UE, such that the vehicular UE is aware of the plurality of SPS configurations that may be activated in the future. The eNodeB and vehicular UE are thus prepared for handling the transmission of one or more of the supported periodic data.

The execution phase will now be explained in more detail. It is then assumed that the vehicular UE eventually will want to transmit some or all of the CAM data components, and thus needs the (semi-persistently allocated) radio resources to perform the transmission. Correspondingly, the vehicular UE will inform the eNB about which CAM components it would like to transmit, and the eNB in response selects, among the previously-prepared SPS configurations, one or more SPS configurations that will allocate suitable radio resources to the vehicular UE so as to transmit all of the now-pending CAM components. The eNB will then correspondingly activate the selected one or more SPS configurations in the UE, e.g., by transmitting a suitable activation command.

The vehicular UE correspondingly activates the specific SPS configurations as instructed by the eNodeB, and thus can use the periodic radio resources scheduled by the activated SPS configurations in order to transmit the pending one or more CAM data components to the other (vehicular) UEs.

As explained above, according to the first embodiment, it is possible to allocate SPS resources to the vehicular UE even though the data to be transmitted by the vehicular UE may have changing periodicities and/or changing message sizes. Therefore, it is possible to reduce the signaling overhead on the Uu link between the eNodeB and the UE otherwise necessary to repeatedly perform the dynamic radio resource allocation (e.g., see ProSe Mode 1 explanations in the background section) for every SC period. Furthermore, a Buffer Status Report, used by the vehicular UE to indicate that (periodic) data is pending for transmittal does not need to be transmitted from the UE to the eNB to trigger the eNB to allocate dynamic resources each time when there is periodic data coming at UE side.

Figure 11:
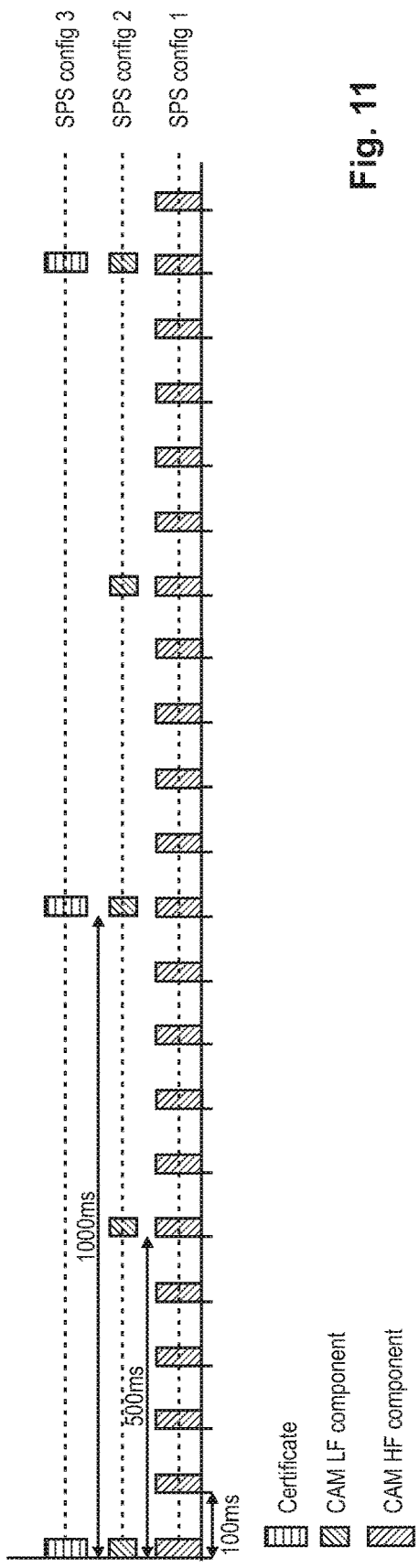
FIG. 11 illustrates the transmission of three different CAM components, as well as the usage of three SPS configurations for transmission of the CAMs according to an exemplary implementation of the first embodiment, FIG. 12 also illustrates the transmission of three different CAM components, as well as the usage of the three SPS configurations for transmission of the CAMs according to a further exemplary implementation of the first embodiment, where the radio resources allocated by the SPS configurations are combined together, FIG. 13 also illustrates the transmission of three different CAM components, as well as the usage of the three SPS configurations for transmission of the CAMs according to a further exemplary implementation of the first embodiment, where the radio resources allocated by the corresponding SPS configuration are sufficient to transmit the complete CAM message, and FIG. 14 also illustrates the transmission of three different CAM components, as well as the usage of the nine different SPS configurations for transmission of the CAMs according to a further exemplary implementation of the first embodiment, having assumed that the vehicular UE supports three different speed ranges, FIG. 15 also illustrates the transmission of three different CAM components, as well as the usage of the ten different SPS configurations for transmission of the CAMs according to a further exemplary implementation of the first embodiment, having assumed that the vehicular UE supports three different speed ranges.

FIG. 11 exemplary illustrates that three different SPS configurations are activated to allow transmission of three different CAM components (Certificate, CAM LF component, and CAM HF component) according to an exemplary implementation of the first embodiment. For this exemplary implementation of the first embodiment, it is assumed that one SPS configuration is configured for one particular CAM data component. Correspondingly, a vehicular UE which wants to transmit the three different CAM components can use the periodic radio resources allocated by SPS configuration 1 to transmit the CAM HF component, can use the periodic radio resources allocated by SPS configuration 2 to transmit the CAM LF component, and can use the periodic radio resources allocated by SPS configuration 3 to transmit the certificate.

Depending on whether the different CAM components are transmitted in one message or in separate messages, the different SPS configurations are to be combined by the vehicular UE to be able to transmit the larger combined CAM message or may be used separately from one another to transmit the separate CAM messages.

In the following more specific implementations of the first embodiment will be.

In a broad implementation of the first embodiment, it was simply assumed without going into further detail that the vehicular UE would support the transmission of periodic data that comprises one or more different data components to be transmitted with different possible transmission periodicities and/or different possible message sizes. As explained before, the challenge posed for the SPS allocation mechanism of the first embodiment is that the transmission of vehicular data involves different possible periodicities and/or different message sizes. This will be explained in more detail based on the CAM messages introduced in the background section.

According to one possible exemplary scenario, the vehicular UE supports the transmission of several CAM components, e.g., the CAM HF component, CAM LF component, and the security certificate. Correspondingly, the possible message size differs depending on which CAM components are transmitted in the CAM message. An overview of the different possible message sizes is given the following table:

TABLE 6

| CAM Component | Size of resulting CAM message |
|---|---|
| CAM HF component (including the header, basic container, signature and digest) | 122 bytes |
| CAM HF component + CAM LF component | 182 bytes |
| CAM HF component + CAM LF component + CAM security certificate | 299 bytes |
| CAM HF component + CAM security certificate | 239 bytes |

For the above table it is assumed that different CAM components transmitted at the same time instance form one single CAM message such that the CAM LF component and the CAM security certificate are respectively piggybacked to the basic CAM HF component transmitted at the highest transmission rate. Correspondingly, the message size will vary depending on the time instance as listed on the right-hand column of the table and as exemplary illustrated in FIG. 11 (due to the assumed different periodicities of the CAM components, FIG. 11 does not show a transmission of the CAM HF component+CAM security certificate; in said respect, see FIG. 10 middle part).

The different CAM components are to be transmitted with different periodicities, such that each possible CAM message to be transmitted at a particular time instance will have to be transmitted at a different periodicity as shown exemplarily in the following table:

TABLE 7

| CAM Component | Size of resulting CAM | Transmission Periodicity |
|---|---|---|
| CAM HF component (including the header, basic container, signature and digest) | 122 bytes | Every 100 ms |
| CAM HF component + CAM LF component | 182 bytes | Every 500 ms |
| CAM HF component + CAM LF component + CAM security certificate | 299 bytes | Every 1000 ms |
| CAM HF component + CAM security certificate | 239 bytes | Every 1000 ms |

The value of the transmission periodicity assumed above actually relates to the periodicity of that CAM component in the CAM message with the lowest transmission rate (e.g., 500 ms of the CAM LF component for the CAM message comprising the CAM HF and CAM LF components). The indicated transmission periodicity should not be understood as the transmission periodicity of the particular CAM message. For example, a CAM message comprising the CAM HF and can LF components is not actually transmitted every 500 ms (but every 1000 ms, see FIG. 11).

The values exemplary assumed in the above table for the transmission periodicity, are those assumed for a single vehicle speed range of >144 km/h, which is assumed that is the only one supported by the vehicular UE.

According to another possible exemplary scenario, the vehicular UE supports the transmission of only one CAM component, e.g., the CAM HF component, having thus an expected fixed size of 122 bytes (see above table) and an expected fixed periodicity of 100 ms (see above table). However, a special characteristic of V2V data is that the periodicity of the different CAM components may vary with the vehicle dynamics, e.g., the speed with which the vehicular UE is traveling. Therefore, even though the vehicular UE supports the transmission of only one CAM component, the periodicity with which the one CAM component is to be transmitted may vary in time resulting again in that several periodicities need to be taken into account by the SPS allocation mechanism. This is exemplified in the following table.

TABLE 8

| CAM Component | Size of resulting CAM | Transmission Periodicity at speed > 144 km/h | Transmission Periodicity at speed [72, 144] km/h | Transmission Periodicity at speed [48, 72] km/h |
|---|---|---|---|---|
| CAM HF component (including the header, basic container, signature and digest) | 122 bytes | Every 100 ms | Every 200 ms | Every 300 ms |

According to another possible exemplary scenario, the vehicular UE supports the transmission of various CAM components (e.g., all three CAM components, CAM HF, CAM LF, and security certificate) and in addition shall support several speeds (ranges). The resulting varying periodicities and message sizes will become apparent from the below table.

TABLE 9

| CAM Component | Size of resulting CAM message | Transmission Periodicity at speed > 144 km/h | Transmission Periodicity at speed [72, 144] km/h | Transmission Periodicity at speed [48, 72] km/h |
|---|---|---|---|---|
| CAM HF component (including the header, basic container, signature and digest) | 122 bytes | Every 100 ms | Every 200 ms | Every 300 ms |
| CAM HF component + CAM LF component | 182 bytes | Every 600 ms | Every 600 ms | Every 600 ms |
| CAM HF component + CAM LF component + CAM security certificate | 299 bytes | Every 1000 ms | Every 1000 ms | Every 1200 ms |
| CAM HF component + CAM security certificate | 239 bytes | Every 1000 ms | Every 1000 ms | Every 1200 ms |

As exemplified above, there may be many different combinations of CAM components (left-hand column of above table), resulting in different possible CAM message sizes (e.g., 122 bytes, 182 bytes, 299 bytes, or 239 bytes) and resulting in different possible periodicities depending on the particular CAM component and/or possibly on the supported speed (ranges) for the vehicular UE (e.g., 100 ms, 200 ms, 300 ms, 500 ms, 600 ms, 1000 ms, 1200 ms). The SPS configurations configured by the eNB in the preparation phase need to take this into account and shall match the resulting CAM message transmission periodicities and/or the resulting CAM message sizes supported by the vehicular UE such that suitable SPS configurations can be activated later to enable the vehicular UE to transmit any (combination) of the supported periodic data.

Various different SPS configurations are prepared by the eNodeB as will be exemplified for the above chosen examples. In particular, at first it is assumed for simplicity that the vehicular UE supports the transmission of several CAM components but only supports one speed range, e.g., the highest speed range of >144 km/h, such that although several different periodicities are to be taken into account, the periodicities themselves do not change over time (e.g., due to a speed change).

TABLE 10

| CAM Component | Size of resulting CAM | Transmission Periodicity | SPS configurations |
|---|---|---|---|
| CAM HF component (including the header, basic container, signature and digest) | 122 bytes | Every 100 ms | SPS config 1 (122 bytes every 100 ms) |
| CAM HF component + CAM LF component | 182 bytes | Every 500 ms | SPS config 2 (60 bytes every 500 ms) |
| CAM HF component + CAM LF component + CAM security certificate | 299 bytes | Every 1000 ms | SPS config 3 (117 bytes every 1000 ms) |
| CAM HF component + CAM security certificate | 239 bytes | Every 1000 ms | No separate SPS config needed |

In the above exemplary implementation of the first embodiment, three different SPS configurations 1, 2 and 3 are configured by the eNodeB such that there is one separate SPS configuration matching each of the possible CAM components that the vehicular UE is supported to transmit. It should be noted that for a possible combination of the CAM HF component and the CAM security certificate, no separate SPS configuration is needed in this particular example, in view of that this particular combination does not happen due to the exemplary periodicities assumed for the separate CAM components.

SPS configuration 1 allocates specific radio resources sufficient to transmit the 122 bytes of the basic CAM HF component every 100 ms, which is the periodicity of the CAM HF component. Correspondingly, the UE will use the periodic radio resources allocated by SPS configuration 1 in order to transmit the CAM messages comprising the CAM HF component.

Moreover, SPS configuration 2 allocates specific radio resources sufficient to transmit the 60 bytes of the additional (piggybacked) CAM LF component every 500 ms, which is the periodicity of the CAM LF component. Correspondingly, the UE will use the periodic radio resources allocated by the SPS configuration 2 in order to transmit the CAM messages comprising the CAM LF component. Furthermore, SPS configuration 3 allocates specific radio resources sufficient to transmit the 117 bytes of the additional (piggybacked) security certificate every 1000 ms, which corresponds to the periodicity of the security certificate. Correspondingly, the UE will use the periodic radio resources allocated by SPS configuration 3 in order to transmit the CAM messages comprising the security certificate.

Figure 12:
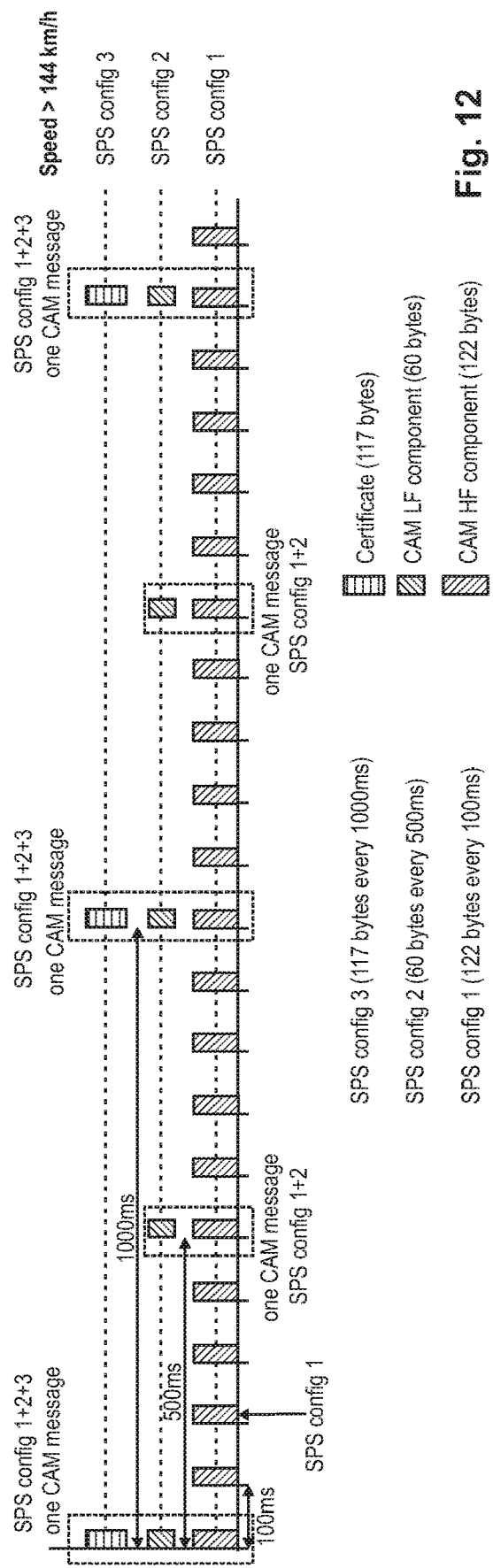

FIG. 12 illustrates the use of the three SPS configurations as exemplarily assumed above for the transmission of the CAM messages by the vehicular UE according to an exemplary implementation of the first embodiment. As apparent from FIG. 12, the three SPS configurations are matching the three different data components to be transmitted by the vehicular UE. The dashed rectangles encompassing the multiple data components to be transmitted at the same time instance shall indicate that these different data components are transmitted as one CAM message, as exemplarily assumed above. As apparent from FIG. 12, at those time instances where several CAM components are to be transmitted within one CAM message, the vehicular UE combines the radio resources allocated by multiple SPS configurations so as to have enough radio resources available to transmit the whole CAM message (i.e., including the multiple CAM components). For instance, when transmitting the CAM HF component together with the CAM LF component, the radio resources allocated via SPS configurations 1 and 2 are combined (i.e., summed, used together) to thus have sufficient radio resources available for the transmission. Similarly, when transmitting the CAM HF component together with the CAM LF component as well as the security certificate, the radio resources allocated via SPS configurations 1, 2 and 3 are combined to thus have sufficient radio resources available to transmit the whole combined CAM message.

As just explained, the radio resources allocated by the different SPS configurations may have to be combined for those time instances where the vehicular UE shall transmit the larger combined CAM messages. According to the following alternative implementation of the first embodiment, this combination of radio resources allocated separately by SPS configurations is no longer necessary. Instead, the separate SPS configurations are configured in such a manner that they already take into account the resulting size of a single CAM message. In line with the discussion above, the following table will exemplary illustrate this alternative implementation of the first embodiment.

TABLE 11

| CAM Component | Size of resulting CAM | Transmission Periodicity | SPS configurations |
|---|---|---|---|
| CAM HF component (including the header, basic container, signature and digest) | 122 bytes | Every 100 ms | SPS config 1 (122 bytes every 100 ms) |
| CAM HF component + CAM LF component | 182 bytes | Every 500 ms | SPS config 2 (182 bytes every 500 ms) |
| CAM HF component + CAM LF component + CAM security certificate | 299 bytes | Every 1000 ms | SPS config 3 (299 bytes every 1000 ms) |
| CAM HF component + CAM security certificate | 239 bytes | Every 1000 ms | No separate SPS config needed |

As apparent from the table, the SPS configurations are different from the previous implementation in that the amount of radio resources allocated by the respective SPS configurations is larger, to thereby take into account the larger CAM message size when several CAM components are transmitted in one CAM message.

Figure 13:
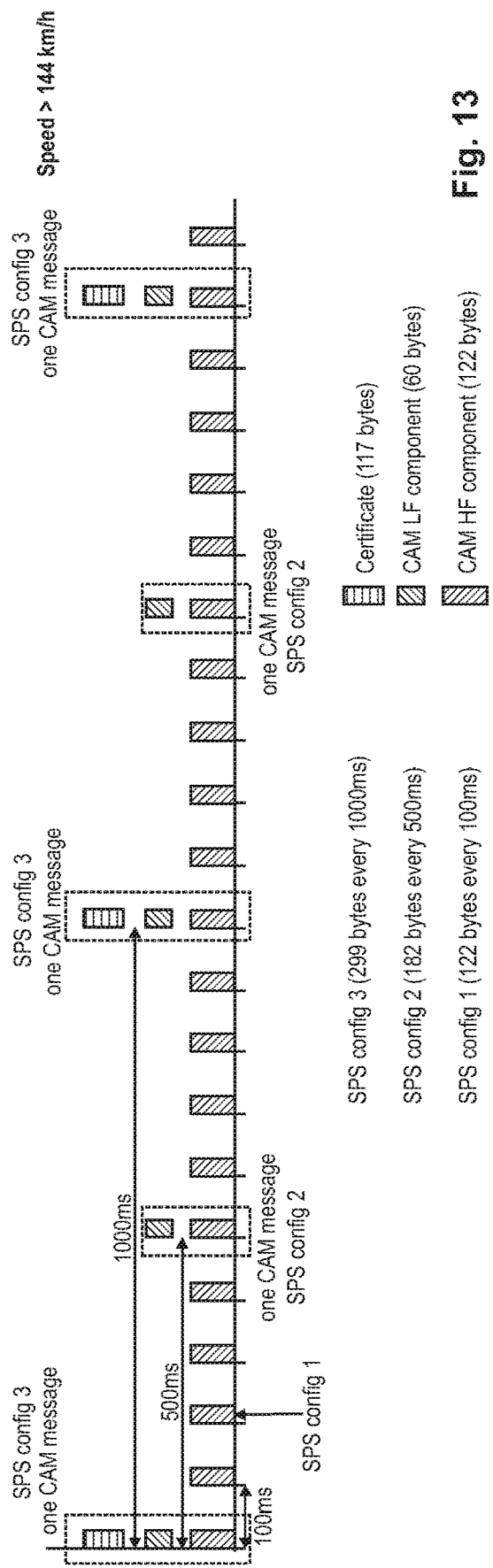

In correspondence with FIG. 12, FIG. 13 illustrates how the different SPS configurations are used by the vehicular UE to transmit the periodic CAM data (components). At those time instances at which the vehicular UE shall transmit several CAM components within one CAM message, the vehicular UE shall select that SPS configuration, among the activated ones, providing sufficient radio resources to transmit the larger CAM message. As in the previous exemplary implementation of the first embodiment, the vehicular UE will select SPS configuration 1 in order to transmit the CAM message comprising only the CAM HF component. On the other hand, when transmitting the CAM HF component together with the CAM LF component, radio resources are needed to transmit 182 bytes in total such that the vehicular UE shall select SPS configuration 2 and shall use the specific radio resources allocated by SPS configuration 2 in order to transmit said CAM message comprising the CAM HF component as well as the CAM LF component. Correspondingly, when transmitting the CAM HF component together with the CAM LF component as well as the security certificate, radio resources are needed to transmit 299 bytes in total such that the vehicular UE shall select SPS configuration 3. The vehicular UE will thus use the specific radio resources allocated by SPS configuration 3 in order to transmit said CAM message comprising the three components.

The above discussed implementations of the first embodiment according to FIG. 12 and FIG. 13 can also be applied to more complex cases where the vehicular UE also supports several speed ranges, e.g., the three assumed speed ranges of >144, between 72 and 144, and between 48 and 72, resulting in additional different periodicities that shall be supported for the respective CAM components.

The following table is assuming that the radio resources allocated by the different SPS configurations can be combined by the vehicular UE to collect sufficient radio resources to be able to transmit the combined CAM messages comprising several data components (see discussion for FIG. 12).

TABLE 12

| CAM Component | Size of resulting CAM | Transmission Periodicity | SPS configurations for speed > 144 km/h | SPS configurations for speed [72, 144] km/h | SPS configurations for speed [48, 72] km/h |
| --- | --- | --- | --- | --- | --- |
| CAM HF component (including the header, basic container, signature and digest) | 122 bytes | Every 100 ms Every 200 ms Every 300 ms | SPS config 1 (122 bytes every 100 ms) | SPS config 4 (122 bytes every 200 ms) | SPS config 7 (122 bytes every 300 ms) |
| CAM HF component + CAM LF component | 182 bytes | Every 500 ms Every 600 ms | SPS config 2 (60 bytes every 500 ms) | SPS config 5 (60 bytes every 600 ms) | SPS config 8 (60 bytes every 600 ms) |
| CAM HF component + CAM LF component + CAM security certificate | 299 bytes | Every 1000 ms Every 1200 ms | SPS config 3 (117 bytes every 1000 ms) | SPS config 6 (117 bytes every 1000 ms) | SPS config 9 (117 bytes every 1200 ms) |
| CAM HF component + CAM security certificate | 239 bytes | Every 1000 ms Every 1200 ms | No separate SPS config needed | No separate SPS config needed | No separate SPS config needed |

As apparent from the above table, it is assumed that the eNodeB in the preparation phase configures 9 separate SPS configurations respectively allocating radio resources with a suitable periodicity so as to enable the vehicle UE, upon later activating one or more SPS configurations, to transmit the corresponding CAM components in a periodic fashion.

Depending on the current speed of the vehicular UE, the eNodeB will configure the vehicular UE to have either activated the SPS configurations 1, 2 and 3 when the speed is >144 km/h, or have activated the SPS configurations 4, 5 and 6 when the speed is between 72 and 144 km/h, or have activated the SPS configurations 7, 8 and 9 when the speed is between 48 and 72 km/h.

Figure 14:
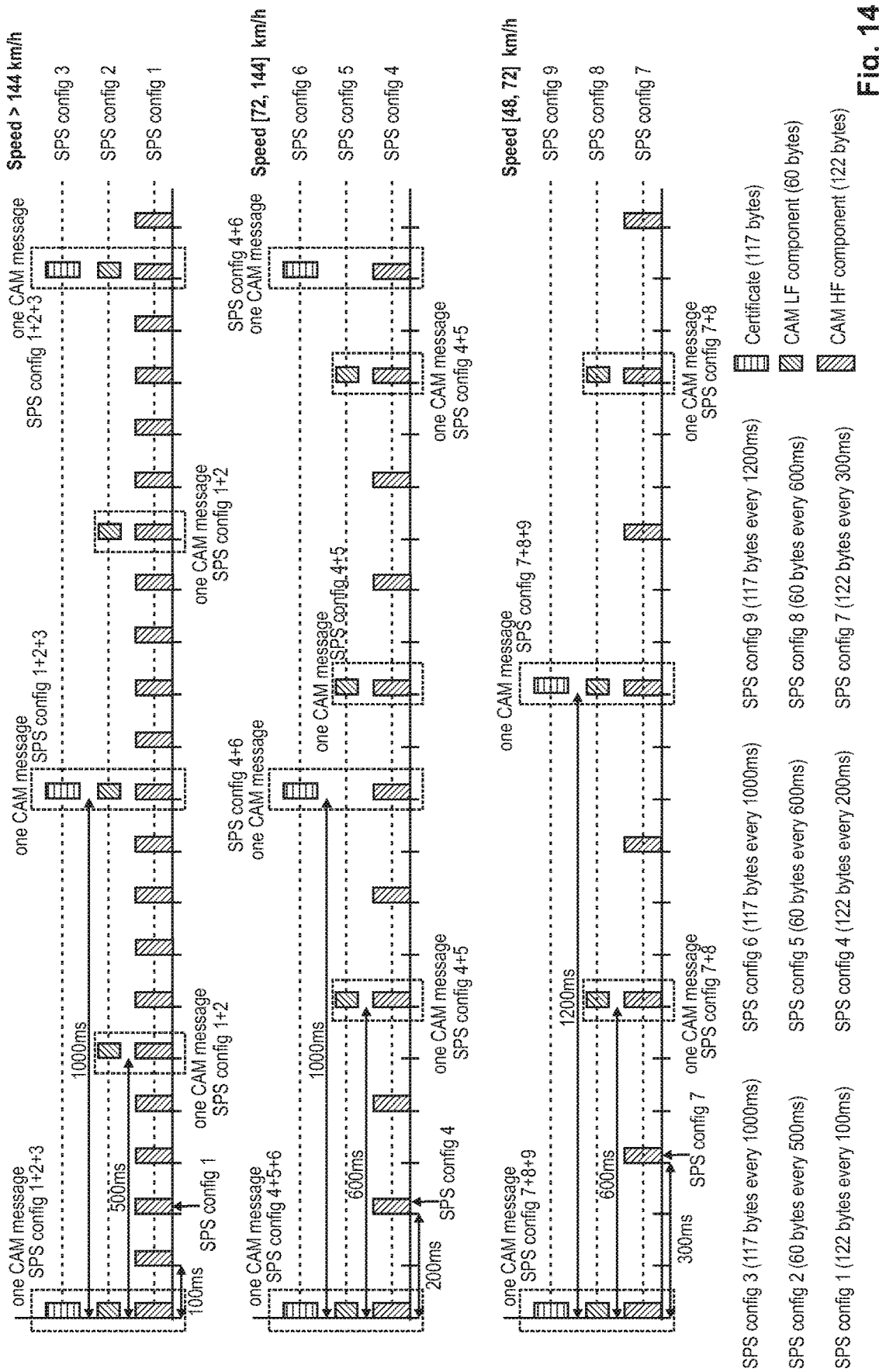

FIG. 14 illustrates how the 9 separate SPS configurations could be used by the vehicular UE to periodically transmit CAM messages of different sizes. The upper part of FIG. 14 (i.e., referring to a speed of >144 km/h) basically corresponds to FIG. 12 and thus will not be explained again. For a speed range between 72 and 144 km/h, FIG. 14 illustrates how the vehicular UE combines the radio resources allocated by the activated SPS configuration 4, 5, and 6 so as to be able to transmit the CAM messages of different sizes. In particular, a CAM message composed of the CAM HF component as well as the CAM LF component may be transmitted by the vehicular UE by combining the radio resources allocated by SPS configurations 4 and 5. A CAM message composed of all three components (CAM HF, CAM LF, security certificate) can be transmitted by the vehicular UE by combining and using the radio resources allocated by SPS configurations 4, 5 and 6. A CAM message composed of the CAM HF component as well as the security certificate can be transmitted by the vehicular UE by combining and using the radio resources allocated by SPS configurations 4 and 6.

For a speed range between 48 and 72 km/h, FIG. 14 illustrates how the vehicular UE combines the radio resources allocated by the activated SPS configurations 7, 8, and 9 to be able to transmit the CAM messages of different sizes. In particular, a CAM message composed of the CAM HF component as well as the CAM LF component may be transmitted by the vehicular UE by combining the radio resources allocated by SPS configurations 7 and 8. A CAM message composed of all three components (CAM HF, CAM LF, security certificate) can be transmitted by the vehicular UE by combining and using the radio resources allocated by SPS configurations 7, 8 and 9.

In the following, the alternative implementation of the first embodiment explained in connection with FIG. 13 will now be also extended to a vehicular UE that supports several speed ranges.

CAM message composed of the CAM HF component as well as the security certificate (see FIG. 14).

As repeatedly mentioned, several SPS configurations are prepared by the eNodeB to support the different possible speed ranges at which the UE may travel (as an example of the vehicle dynamics which influence the periodicity of the various CAM data components). In such a scenario, the eNB also needs to be informed on the possible speed ranges supported by the vehicular UE, since these will influence the different periodicities that are to be taken into account when preparing the plurality of SPS configuration. One option is to transmit explicit information on the speed ranges that are supported by the vehicular UE to the eNB, e.g., together or separate from the information on the periodic data, so as to enable the eNB to determine therefrom the resulting different periodicities of the periodic data components that need to be considered when preparing the plurality of SPS configurations. Another option is that the vehicular UE transmits already the various possible periodicities which com-

TABLE 13

| CAM Component | Size of resulting CAM | Transmission Periodicity | SPS configurations for speed > 144 km/h | SPS configurations for speed [72, 144] km/h | SPS configurations for speed [48, 72] km/h |
|---|---|---|---|---|---|
| CAM HF component (including the header, basic container, signature and digest) | 122 bytes | Every 100 ms Every 200 ms Every 300 ms | SPS config 1 (122 bytes every 100 ms) | SPS config 4 (122 bytes every 200 ms) | SPS config 8 (122 bytes every 300 ms) |
| CAM HF component + CAM LF component | 182 bytes | Every 500 ms Every 600 ms | SPS config 2 (182 bytes every 500 ms) | SPS config 5 (182 bytes every 600 ms) | SPS config 9 (182 bytes every 600 ms) |
| CAM HF component + CAM LF component + CAM security certificate | 299 bytes | Every 1000 ms Every 1200 ms | SPS config 3 (299 bytes every 1000 ms) | SPS config 6 (299 bytes every 1000 ms) | SPS config 10 (299 bytes every 1200 ms) |
| CAM HF component + CAM security certificate | 239 bytes | Every 1000 ms Every 1200 ms | No separate SPS config needed | SPS config 7 (239 bytes every 1000 ms) | No separate SPS config needed |

Figure 15:
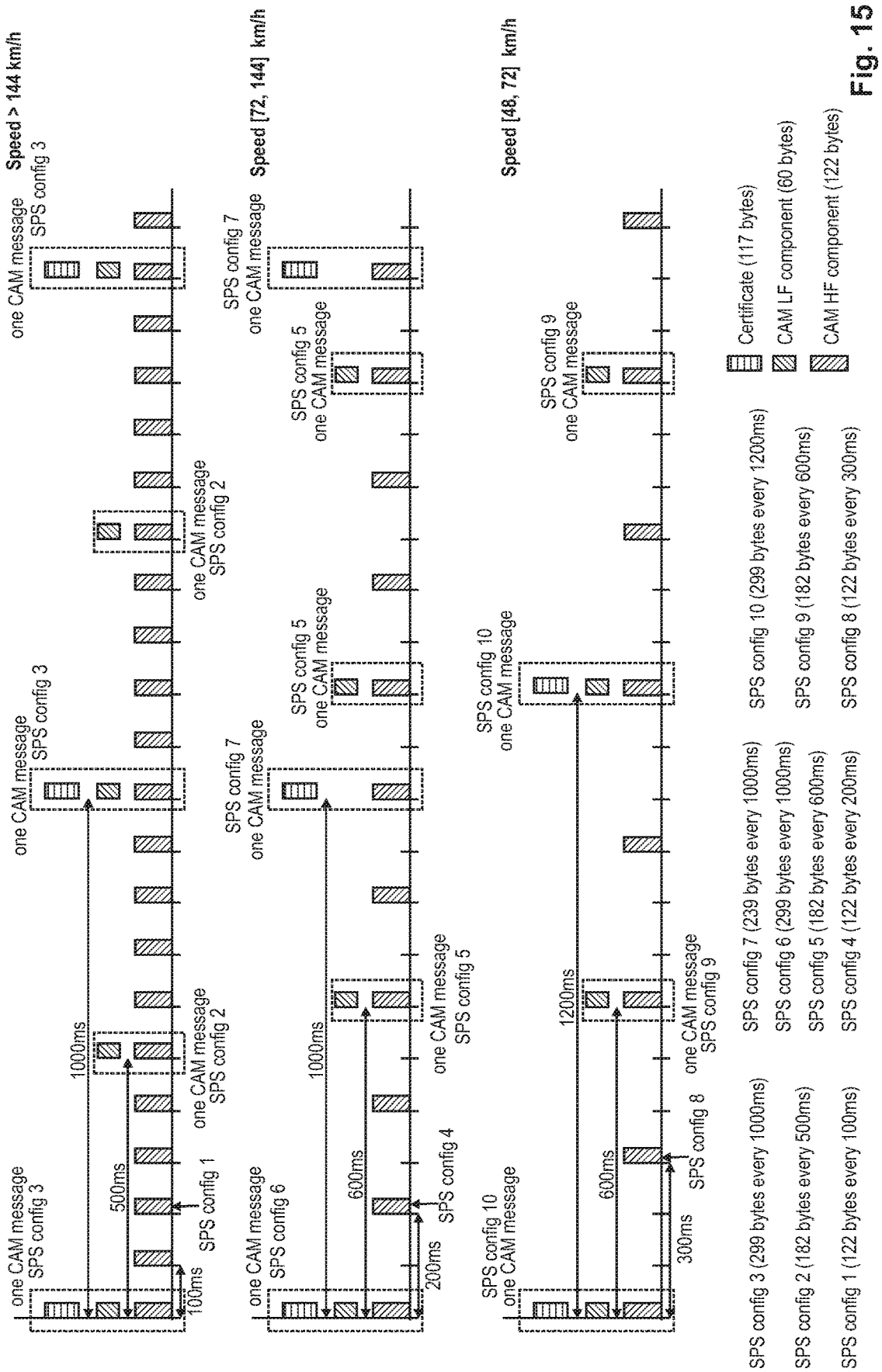

FIG. 15 illustrates the corresponding usage of the different SPS configurations by the vehicular UE in order to transmit the various possible CAM messages. The upper part of FIG. 15 (referring to a speed of >144 km/h) basically corresponds to FIG. 13 and thus will not be explained again. In order to support the transmission of all possible CAM components for a speed range between 72 and 144 km/h, four different SPS configurations are configured by the eNodeB. Unlike the scenario for the speed range of >144 km/h, the vehicular UE indeed has to transmit a CAM message composed of a CAM HF component and a CAM security certificate. In this alternative implementation of the first embodiment, the eNodeB has to thus configure a separate SPS configuration for this possible CAM message, i.e., SPS configuration 7 allocating specific radio resources sufficient to transport 239 bytes every 1000 ms. This SPS configuration 7 was not necessary in the previous implementation of the first embodiment, since the radio resources of SPS configurations 4 and 6 could be flexibly combined so as to allocate sufficient (but not too many) resources for transmitting the prise also periodicities at the supported speed ranges, such that it is not necessary for the UE to additionally inform the eNB on the supported speed ranges; the eNB might deduce the supported speed ranges from the reported different periodicities, assuming that the eNB has access to particular information allowing this association to be made, such as standardized definitions for the periodicities of CAM messages and components at different speed ranges.

Furthermore, when the UE would like to actually start transmitting the periodic data, the UE shall inform the eNB about its current speed (or about the speed range it is in), such that the eNB may select and activate those SPS configurations prepared for that indicated speed range currently experienced by the vehicular UE. The information on the current speed could for example be transmitted by the vehicular UE together with or separate from the indication which data components the vehicular UE would like to transmit. For example, an exemplary implementation of the first embodiment provides that this indication is the buffer status report indicating that for particular logical channel groups data is pending in the corresponding buffer in the UE. Correspondingly, the information on the current speed of the vehicle UE could be transmitted within the buffer status report too.

Furthermore, as mentioned before, the periodicities of CAM data components may be dependent on vehicle dynamics, such as the speed, which however may change over time. Further implementations of the first embodiment thus allow to change the activated SPS configurations depending on the current vehicle dynamics (e.g., speed of the vehicle UE). In said respect, the vehicle UE may monitor its own speed and may determine whether the speed range has changed compared to the speed range it was previously in. In that case, the vehicular UE may inform the eNodeB about this change of speed range. Alternatively, the vehicular UE may regularly transmit information on its current speed to the eNodeB such that the eNodeB itself may determine when a particular vehicular UE changes the speed range relevant for the SPS configurations. In any case, the change of speed range may thus trigger the eNodeB to select and activate different SPS configurations prepared for that indicated speed range instead of the previously activated SPS configurations. The vehicular UE, receiving such an activation command for the changed SPS configurations, will no longer use the previously activated SPS configurations, but will use the newly activated SPS configurations.

According to another alternative implementation of the first embodiment, instead of transmitting the current speed or the current changed speed range to the eNodeB, the vehicular UE, when determining that it has changed a particular speed range, may actually identify the corresponding SPS configurations that are needed for that changed speed range, and may transmit a request to the eNodeB to use these new SPS configurations due to the change of the speed range. In turn, the eNodeB receives this request and may decide on whether it shall follow the request or not. Correspondingly, it may determine that a change of the SPS configurations is in order, and thus it correspondingly transmits a response to the request so as to activate the requested SPS configurations. The vehicular UE will thus no longer use the previously activated SPS configurations, but will use now the newly activated SPS configurations.

When changing the SPS configurations in the vehicular UE as just explained due to a change of the vehicle dynamics (e.g., speed), according to one possible implementation of the first embodiment, the vehicular UE may always start by transmitting all of the CAM components (i.e., a CAM message comprising all CAM components) in order to avoid that some of the components are not transmitted due to a frequent change of speed and thus a frequent a change of the SPS configurations.

As explained above, the vehicular UE transmits to the eNB information on the supported periodic data that the vehicular UE might have to transmit in the future. As will be explained in detail with reference to the following implementations of the first embodiment, this may be implemented in various manners. According to an exemplary implementation of the first embodiment, the vehicular UE may inform the eNodeB explicitly about the different possible periodicities and/or different possible message sizes of the CAM messages/components that the vehicular UE supports and thus may have to actually transmit in the future. For example, the information on the periodic data may thus include a list of possible periodicities and/or of possible CAM message sizes that are supported by the vehicular UE. The eNodeB is thus able to prepare suitable SPS configurations for the various different supported periodicities and/or message sizes.

According to variants of this implementation of the first embodiment, the information on the periodic data may be transmitted in one message or in at least two separate messages. In particular, the information on the possible periodicities and the possible message sizes may be transmitted within one message, for instance a message which is based on the SidelinkUEInformation message currently specified in the standards to indicate sidelink information to the eNodeB (e.g., the frequency on which the UE is interested to transmit sidelink communication as well as the sidelink communication transmission destinations for which the UE requests to be assigned dedicated resources) (see 3GPP standard TS 36.331 v13.0.0 section 6.2.2, incorporated herein by reference). In FIGS. 16A, 16B and 16C, an exemplary extended SidelinkUEInformation message according to this implementation of the first embodiment is defined.

The additional elements exemplarily introduced into the SidelinkUEInformation message of this implementation of the first embodiment are bold and also framed in FIGS. 16A, 16B and 16C. As apparent therefrom, there is a periodicity field allowing to indicate various different periodicities, such as the ones mentioned above for the CAM messages. Similarly, a message size field is provided which allows to indicate various different message sizes, respectively with a value between 1 and 300 bytes. Optionally, a traffic type field allows the UE to inform the eNodeB on whether the data is periodic or nonperiodic.

Alternatively, instead of indicating the message size(s) together with the possible periodicities, according to a further variant of the first embodiment, the message size (i.e., the amount of data the UE wants to transmit) is transmitted together with the Buffer Status Report, which indicates that data is pending for being transmitted by the vehicular UE. In this case, in one example in the preparation phase the eNodeB will only receive information on the possible different periodicities but no information on the possible different message sizes, and will thus proceed to prepare different SPS configurations based on the information of the possible different periodicities. For instance, the plurality of SPS configurations prepared by the eNodeB would be different as to the periodicities, but would not be specific as to which and how many radio resources would be allocated by the SPS configuration. Then, at the time at which the vehicular UE actually wants to start transmitting one or more of the possible data components, the corresponding buffer(s) will be filled, thus triggering a buffer status report to be transmitted to the eNodeB and on which basis the eNodeB may actually determine the amount of data that the UE would like to transmit for the one or more possible data components. In response, the eNodeB would select and activate the corresponding suitable SPS configurations (with the corresponding suitable periodicities), and would then activate the selected SPS configuration(s) for the vehicular UE while at the same time indicating, for each activated SPS configuration, which resources are allocated by the respective activated SPS configuration.

Put differently, unlike previously explained in connection with FIGS. 11 to 15, in this particular variant of the first embodiment the eNodeB does not already specify the radio resources (for example, SPS configuration 1 defining radio resources sufficient to transmit 122 bytes) but only specifies the periodicities. For example, the eNodeB might prepare an SPS configuration 1 for supporting transmittal of the CAM HF component by the vehicular UE with a periodicity of 100 ms (assuming a speed range of >144 km/h); similarly also for the other SPS configurations. For the scenario assumed for FIG. 12, the eNodeB would thus also prepare three different SPS configurations, namely respectively for the three periodicities of every 100 ms, 500 ms, and 1000 ms. For the scenario assumed for FIG. 14, the eNodeB would prepare nine different SPS configurations, respectively three for each speed range.

According to another exemplary implementation of the first embodiment, the vehicular UE may inform the eNodeB on the particular data components that the vehicular UE is supported to transmit in addition or instead of transmitting information on the different possible transmission periodicities and/or different possible message sizes. For example, the information on the periodic data may thus include a list identifying the data components which the vehicular UE is supported to transmit in the future. The eNodeB has access to information about the possible periodicities and message sizes that are associated with these identified data components; for instance, the 3GPP standardization may explicitly define sizes and periodicities for the different possible CAMs and their components. In this manner, the eNodeB is thus able to prepare suitable SPS configurations for the various different supported periodicities and/or message sizes.

Although not specified in detail above, the activation command transmitted by the eNodeB to the vehicular UE to activate the selected SPS configurations may be exemplarily implemented as a message transmitted via the PDCCH, physical downlink control channel. For instance, in a similar manner as for the currently specified SPS mechanism, the eNodeB may transmit one or more DCIs to activate one or more of the previously configured SPS configurations. In one example, a new C-RNTI might be used for DCIs for sidelink activation/deactivation, since UE needs to know that the DCIs are for sidelink SPS, not for Uu SPS or Uu link dynamic allocation. As mentioned above, for particular implementations of the first embodiment, the PDCCH message may also identify the particular radio resources which the UE is supposed to use for the activated SPS configuration(s).

Although not specified in detail above, the eNodeB, after having determined the plurality of SPS configurations, shall inform the UE about the plurality of SPS configurations. This may for instance be implemented as an RRC message, such as sps-ConfigSidelink in radioResourceConfigDedicated message. The current SPS configuration for Uu link is transmitted in the radioResourceConfigDedicated message. To indicate the SPS configurations for sidelink, a new element could be created as sps-ConfigSidelink, which could be also transmitted in radioResourceConfigDedicated message. As explained above, the plurality of SPS configurations configured by the eNodeB in the preparation phase could for instance identify both the periodicity and radio resources, or may only identify the periodicity (where the radio resources could then be identified together with the activation command transmitted from the eNodeB to the UE).

Although the implementations of the first embodiment have been explained on the basis of V2V and a vehicular UE in communication with other vehicle UEs via the sidelink connection, the underlying principles of the first embodiment could also be applied for transmitting vehicular data between a vehicular UE and for instance the eNodeB via the Uu interface or between a vehicular UE and Road Side Unit via, e.g., PC5 interface.

Furthermore, although the implementations of the first embodiment have been explained on the basis of a vehicular UE, the underlying principles of the first embodiment could also be performed by "normal" UEs that are in communication with the eNB or with other "normal" or vehicular UEs via sidelink connection(s).

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicular mobile terminal for transmitting periodic data in V2X communication, the vehicular mobile terminal comprising:
   a transmitter, which, in operation,
      transmits, to a radio base station, information related to vehicle parameters supported by the vehicular mobile terminal, and
      in response to one of the vehicle parameters in a previous value range changing to be in a different value range, transmits, to the radio base station, information related to the changed vehicle parameter; and
   a receiver, which, in operation,
      receives, from the radio base station, a plurality of semi-persistent radio resource configurations configured by the radio base station based on the information related to vehicle parameters, and
      receives, from the radio base station, an activation command to activate one or more of the plurality of semi-persistent radio resource configurations, the activation command being configured by the radio base station based on the information related to the changed vehicle parameter,
   wherein the transmitter, in operation, transmits the periodic data in V2X communication using a transmission periodicity defined by the activated one or more of the semi-persistent radio resource configurations, and
   wherein the information related to vehicle parameters includes information on a message size of at least one data component of the periodic data.

2. The vehicular mobile terminal according to claim 1, wherein
   the information related to vehicle parameters is transmitted within one message, or
   the information related to vehicle parameters is transmitted within at least two separate messages, wherein information on different possible periodicities is transmitted within a first message and the information on a message size of at least one data component of the periodic data is transmitted together with a buffer status report.

3. The vehicular mobile terminal according to claim 1, wherein each of the plurality of semi-persistent radio resource configurations identifies:
   radio resources and a periodicity suitable for transmitting at least one data component of the periodic data, wherein the plurality of semi-persistent radio resource configurations are received in a message of a Radio Resource Control (RRC) protocol, or
   a periodicity for transmitting at least one data component of the periodic data, wherein information on radio resources usable by the vehicular mobile terminal to transmit at least one data component of the periodic data is received together with the activation command in a message via a Physical Downlink Control Channel (PDCCH).

4. The vehicular mobile terminal according to claim 1, wherein data components of the periodic data, transmitted at the same time instance, are either transmitted as one message or as separate messages.

5. The vehicular mobile terminal according to claim 1, wherein the transmitter, in operation, transmits the periodic data to other vehicular or non-vehicular mobile terminals via a sidelink connection, and/or transmits the periodic data to the radio base station via a radio connection.

6. The vehicular mobile terminal according to claim 1, wherein the plurality of semi-persistent radio resource configurations are configured such that there is one semi-persistent radio resource configuration for each data component with a specific message size and a specific transmission periodicity.

7. The vehicular mobile terminal according to claim 1, wherein the vehicle parameters include a speed parameter.

8. The vehicular mobile terminal according to claim 1, wherein data components of the periodic data, transmitted at the same time instance, are transmitted as one message, and the plurality of semi-persistent radio resource configurations are configured such that there is one semi-persistent radio resource configuration for each possible message comprising one or more of the data components.

9. A radio base station for allocating radio resources to a vehicular mobile terminal to transmit periodic data in V2X communication, the radio base station comprising:
   a receiver, which, in operation,
      receives, from the vehicular mobile terminal, information related to vehicle parameters supported by the vehicular mobile terminal, and
      receives, from the vehicular mobile terminal, information related to a changed vehicle parameter in response to one of the vehicle parameters in a previous value range changing to be in a different value range; and
   a processor, which, in operation,
      determines different possible transmission periodicities of one or more data components of the periodic data based on the information related to vehicle parameters,
      configures a plurality of semi-persistent radio resource configurations based on the different possible transmission periodicities, and
      configures an activation command, based on the information related to the changed vehicle parameter, to activate one or more of the plurality of semi-persistent radio resource configurations for use by the vehicular mobile terminal to transmit the periodic data in V2X communication; and
   a transmitter, which, in operation,
      transmits, to the vehicular mobile terminal, information on the plurality of semi-persistent radio resource configurations, and
      transmits, to the vehicular mobile terminal, the activation command,
   wherein the information related to vehicle parameters includes information on a message size of at least one data component of the periodic data.

10. The radio base station according to claim 9, wherein each of the plurality of semi-persistent radio resource configurations identifies:
   radio resources and a periodicity suitable for transmitting at least one data component of the periodic data, wherein the information on the plurality of semi-persistent radio resource configurations is transmitted in a message of a Radio Resource Control (RRC) protocol, or a periodicity for transmitting at least one data component of the periodic data, wherein information on radio resources usable by the vehicular mobile terminal to transmit at least one data component of the periodic data is transmitted together with the activation command in a message via a Physical Downlink Control Channel (PDCCH).

11. The radio base station according to claim 9, wherein the plurality of semi-persistent radio resource configurations are configured such that there is one semi-persistent radio resource configuration for each data component with a specific message size and specific transmission periodicity.

12. The radio base station according to claim 9, wherein the vehicle parameters include a speed parameter.

13. A method performed by a vehicular mobile terminal to transmit periodic data in V2X communication, the method comprising:

transmitting, to a radio base station, information related to vehicle parameters supported by the vehicular mobile terminal;

receiving, from the radio base station, a plurality of semi-persistent radio resource configurations configured by the radio base station based on the information related to vehicle parameters;

in response to one of the vehicle parameters in a previous value range changing to be in a different value range, transmitting, to the radio base station, information related to the changed vehicle parameter;

receiving, from the radio base station, an activation command to activate one or more of the plurality of semi-persistent radio resource configurations, the activation command being configured by the radio base station based on the information related to the changed vehicle parameter; and transmitting the periodic data in V2X communication using a transmission periodicity defined by the activated one or more of the semi-persistent radio resource configurations, wherein the information related to vehicle parameters includes information on a message size of at least one data component of the periodic data.

14. A method performed by a radio base station to allocate radio resources to a vehicular mobile terminal to transmit periodic data in V2X communication, the method comprising:

receiving, from the vehicular mobile terminal, information related to vehicle parameters supported by the vehicular mobile terminal;

determining different possible transmission periodicities of one or more data components of the periodic data based on the information related to vehicle parameters;

configuring a plurality of semi-persistent radio resource configurations based on the different possible transmission periodicities;

transmitting, to the vehicular mobile terminal, information on the plurality of semi-persistent radio resource configurations;

receiving, from the vehicular mobile terminal, information related to a changed vehicle parameter in response to one of the vehicle parameters in a previous value range changing to be in a different value range;

configuring an activation command, based on the information related to the changed vehicle parameter, to activate one or more of the plurality of semi-persistent radio resource configurations for use by the vehicular mobile terminal to transmit the periodic data in V2X communication; and transmitting, to the vehicular mobile terminal, the activation command, wherein the information related to vehicle parameters includes information on a message size of at least one data component of the periodic data.

15. An integrated circuit comprising circuitry configured to control a radio base station to allocate radio resources to a vehicular mobile terminal to transmit periodic data in V2X communication, the circuitry configured to:

control receiving, from the vehicular mobile terminal, information related to vehicle parameters supported by the vehicular mobile terminal;

determine different possible transmission periodicities of one or more data components of the periodic data based on the information related to vehicle parameters;

configure a plurality of semi-persistent radio resource configurations based on the different possible transmission periodicities;

control transmitting, to the vehicular mobile terminal, information on the plurality of semi-persistent radio resource configurations;

control receiving, from the vehicular mobile terminal, information related to a changed vehicle parameter in response to one of the vehicle parameters in a previous value range changing to be in a different value range;

configure an activation command, based on the information related to the changed vehicle parameter, to activate one or more of the plurality of semi-persistent radio resource configurations for use by the vehicular mobile terminal to transmit the periodic data in V2X communication; and control transmitting, to the vehicular mobile terminal, the activation command, wherein the information related to vehicle parameters includes information on a message size of at least one data component of the periodic data.

* * * * *